US012593115B2

(12) United States Patent
Kishine et al.

(10) Patent No.: US 12,593,115 B2
(45) Date of Patent: Mar. 31, 2026

(54) DATA PROCESSING APPARATUS, DATA PROCESSING METHOD, DATA PROCESSING PROGRAM, OPTICAL ELEMENT, IMAGING OPTICAL SYSTEM, AND IMAGING APPARATUS TO SELECT SUITABLE WAVELENGTH FOR OBJECT DETECTION

(71) Applicant: FUJIFILM Corporation, Tokyo (JP)

(72) Inventors: Yasunobu Kishine, Saitama (JP); Atsushi Kawanago, Saitama (JP); Kazuyoshi Okada, Saitama (JP); Yuya Hirakawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 89 days.

(21) Appl. No.: 18/359,856

(22) Filed: Jul. 26, 2023

(65) Prior Publication Data

US 2023/0370700 A1 Nov. 16, 2023

Related U.S. Application Data

(63) Continuation of application No. PCT/JP2022/002756, filed on Jan. 26, 2022.

(30) Foreign Application Priority Data

Jan. 29, 2021 (JP) ................................. 2021-013412

(51) Int. Cl.
| | |
|---|---|
| *H04N 23/10* | (2023.01) |
| *G06V 10/143* | (2022.01) |
| *G06V 10/58* | (2022.01) |

(52) U.S. Cl.
CPC ........... *H04N 23/10* (2023.01); *G06V 10/143* (2022.01); *G06V 10/58* (2022.01)

(58) Field of Classification Search
CPC .... G01J 2003/2826; G01J 3/0224; G01J 3/28; G01J 3/2803; G01J 3/46;
(Continued)

(56) References Cited

U.S. PATENT DOCUMENTS

| | | | |
|---|---|---|---|
| 5,557,414 A | 9/1996 | Allaire et al. | |
| 7,821,670 B2 | 10/2010 | Nakaya et al. | |

(Continued)

FOREIGN PATENT DOCUMENTS

| | | |
|---|---|---|
| CN | 101196720 | 6/2008 |
| CN | 106999021 | 8/2017 |

(Continued)

OTHER PUBLICATIONS

"Partial Search Report of Europe Counterpart Application", issued on Jun. 5, 2024, pp. 1-11.
(Continued)

*Primary Examiner* — Antoinette T Spinks
(74) *Attorney, Agent, or Firm* — JCIPRNET

(57) ABSTRACT

A data processing apparatus includes a processor, in which the processor executes data acquisition processing of acquiring spectral data of a plurality of subjects, calculation processing of calculating intensity characteristics at a first wavelength and a second wavelength selected from wavelength ranges of the acquired spectral data of the plurality of subjects based on a relationship between two wavelengths which are the first wavelength and the second wavelength, data conversion processing of converting the intensity characteristics calculated in the calculation processing into discrimination data of a specific subject for the wavelength range, and output processing of outputting the discrimination data to an outside.

19 Claims, 17 Drawing Sheets

(58) Field of Classification Search
CPC .......... G01N 2021/8887; G01N 21/27; G01N 21/8851; G01N 21/94; H04N 23/10; G06V 10/143; G06V 10/58; G06V 20/188; G06V 20/68
See application file for complete search history.

(56) References Cited

U.S. PATENT DOCUMENTS

| | | | |
|---|---|---|---|
| 10,379,035 B2 | 8/2019 | Noda et al. | |
| 10,481,095 B2 | 11/2019 | Dimitriadis et al. | |
| 10,684,224 B2 | 6/2020 | Dimitriadis et al. | |
| 11,122,242 B2 | 9/2021 | Ono | |
| 11,706,506 B2 | 7/2023 | Okada et al. | |
| 11,877,076 B2 | 1/2024 | Ono | |
| 2014/0125988 A1* | 5/2014 | Wang | G01B 9/02091 |
| | | | 356/479 |
| 2017/0343477 A1* | 11/2017 | Santori | G01J 3/18 |
| 2021/0293622 A1* | 9/2021 | Klimek | G01J 3/0213 |
| 2021/0295042 A1* | 9/2021 | Takashima | G06V 10/143 |
| 2022/0078319 A1 | 3/2022 | Okada et al. | |

FOREIGN PATENT DOCUMENTS

| | | |
|---|---|---|
| CN | 111717440 | 9/2020 |
| EP | 3716136 | 9/2020 |
| JP | 2000249661 | 9/2000 |
| JP | 2007178407 | 7/2007 |
| JP | 2010117171 | 5/2010 |
| JP | 2013258647 | 12/2013 |
| JP | 2017053699 | 3/2017 |
| JP | 2017053699 A * | 3/2017 |
| JP | 2017064405 | 4/2017 |
| JP | 2017064405 A * | 4/2017 |
| JP | 2018125770 | 8/2018 |
| WO | 2017168469 | 10/2017 |
| WO | 2020075523 | 4/2020 |
| WO | 2020110595 | 6/2020 |
| WO | 2020250774 | 12/2020 |

OTHER PUBLICATIONS

"International Search Report (Form PCT/ISA/210) of PCT/JP2022/002756", mailed on Mar. 22, 2022, with English translation thereof, pp. 1-5.
"Written Opinion of the International Searching Authority (Form PCT/ISA/237) of PCT/JP2022/002756", mailed on Mar. 22, 2022, with English translation thereof, pp. 1-9.
"Search Report of Europe Counterpart Application", issued on Jun. 26, 2024, pp. 1-11.
"Notice of Reasons for Refusal of Japan Counterpart Application", issued on Sep. 25, 2025, with English translation thereof, p. 1-p. 13.
"Office Action of China Counterpart Application", issued on Jan. 14, 2026, with English translation thereof, pp. 1-12.

* cited by examiner

DATA PROCESSING APPARATUS, DATA PROCESSING METHOD, DATA PROCESSING PROGRAM, OPTICAL ELEMENT, IMAGING OPTICAL SYSTEM, AND IMAGING APPARATUS TO SELECT SUITABLE WAVELENGTH FOR OBJECT DETECTION

CROSS-REFERENCE TO RELATED APPLICATIONS

The present application is a Continuation of PCT International Application No. PCT/JP2022/002756 filed on Jan. 26, 2022 claiming priority under 35 U.S.C. § 119(a) to Japanese Patent Application No. 2021-013412 filed on Jan. 29, 2021. Each of the above applications is hereby expressly incorporated by reference, in its entirety, into the present application.

BACKGROUND OF THE INVENTION

1. Field of the Invention

The present invention relates to a data processing apparatus, a data processing method, a data processing program, an optical element, an imaging optical system, and an imaging apparatus, particularly, relates to selection of a wavelength suitable for detection of a detection object.

2. Description of the Related Art

In the related art, there is a hyperspectral camera capable of executing spectral sensing using a wavelength of 100 or more.

In this type of hyperspectral camera, since many wavelengths are measured, it is common to sense a detection object by searching for a wavelength at which reflection or absorption is abruptly changed (for example, the spectral reflectance is obtained by taking a secondary differentiation in a wavelength direction to search for a peak wavelength).

In addition, in the related art, a foreign matter contamination examination device that examines a foreign matter in a case in which the foreign matter, such as hair, is included in an examination object, such as food, cosmetics, or a chemical, has been proposed (JP2007-178407A).

This foreign matter contamination examination device irradiates the examination object with light in a first wavelength range and light in a second wavelength range in which relative relationships between a brightness value of the foreign matter and a brightness value of the examination object are different from each other, acquires a first spectral image based on a brightness value of the first wavelength range and a second spectral image based on a brightness value of the second wavelength range, and acquires a foreign matter extraction image in which the foreign matter included in the examination object can be discriminated from the examination object by the operation between the acquired first spectral image and second spectral image.

SUMMARY OF THE INVENTION

One embodiment according to the technology of the present disclosure provides a data processing apparatus, a data processing method, a data processing program, an optical element, an imaging optical system, and an imaging apparatus which can easily specify a wavelength combination of a first wavelength and a second wavelength suitable for detection of a detection object from among a plurality of subjects including the detection object.

A first aspect of the present invention relates to a data processing apparatus comprising a processor, in which the processor executes data acquisition processing of acquiring spectral data of a plurality of subjects, calculation processing of calculating intensity characteristics at a first wavelength and a second wavelength selected from wavelength ranges of the acquired spectral data of the plurality of subjects based on a relationship between two wavelengths which are the first wavelength and the second wavelength, data conversion processing of converting the intensity characteristics calculated in the calculation processing into discrimination data of a specific subject for the wavelength range, and output processing of outputting the discrimination data to an outside.

In the data processing apparatus according to a second aspect of the present invention, it is preferable that the intensity characteristic is an intensity difference and/or an intensity ratio.

In the data processing apparatus according to a third aspect of the present invention, it is preferable that, in a case in which spectral data of a first subject in the spectral data of the plurality of subjects is denoted by $A(\lambda)$, spectral data of a second subject in the spectral data of the plurality of subjects is denoted by $B(\lambda)$, and the first wavelength and the second wavelength, which are to be selected, are denoted by $\lambda1$ and $\lambda2$, respectively, the intensity difference and/or the intensity ratio is calculated by the following expression of [Math. 1] and/or expression of [Math. 2].

$$\text{Intensity difference} = \left| \frac{A(\lambda1) - A(\lambda2)}{A(\lambda1) + A(\lambda2)} - \frac{B(\lambda1) - B(\lambda2)}{B(\lambda1) + B(\lambda2)} \right| \qquad \text{[Math. 1]}$$

$$\text{Intensity ratio} = \left| \frac{A(\lambda1) - A(\lambda2)}{A(\lambda1) + A(\lambda2)} \middle/ \frac{B(\lambda1) - B(\lambda2)}{B(\lambda1) + B(\lambda2)} \right| \qquad \text{[Math. 2]}$$

In the data processing apparatus according to a fourth aspect of the present invention, it is preferable that the discrimination data is a first map representing a change in the intensity characteristic with a wavelength as a variable.

In the data processing apparatus according to a fifth aspect of the present invention, it is preferable that the first map is a two-dimensional map, and coordinate axes of the two-dimensional map are the first wavelength and the second wavelength.

In the data processing apparatus according to a sixth aspect of the present invention, it is preferable that a destination of the output of the discrimination data to the outside is a display device, and the processor executes processing of receiving a specific position on the first map displayed on the display device in response to a user indication, and processing of specifying a wavelength combination of the first wavelength and the second wavelength to be used for detection of a detection object among the plurality of subjects based on the specific position.

In the data processing apparatus according to a seventh aspect of the present invention, it is preferable that the processor executes processing of extracting one or a plurality of positions on the first map at which the intensity characteristic exceeds a threshold value from the first map, and processing of specifying one or a plurality of wavelength combinations of the first wavelength and the second wavelength to be used for detection of a detection object among the plurality of subjects based on the extracted positions.

In the data processing apparatus according to an eighth aspect of the present invention, it is preferable that a destination of the output of the discrimination data to the outside is a display device, and the processor executes processing of displaying candidates for a specific position in the one or plurality of wavelength combinations of the first wavelength and the second wavelength in a superimposed manner on the first map displayed on the display device, processing of receiving the specific position from among the candidates for the specific position in response to a user indication, and processing of specifying the wavelength combination of the first wavelength and the second wavelength based on the received specific position.

In the data processing apparatus according to a ninth aspect of the present invention, it is preferable that the plurality of subjects include a first subject, a second subject, and a third subject, in the data acquisition processing, spectral data of the first subject, spectral data of the second subject, and spectral data of the third subject are acquired, in the calculation processing, two or more intensity characteristics, out of the intensity characteristics of the spectral data of the first subject and the spectral data of the second subject at the first wavelength and the second wavelength, the intensity characteristics of the spectral data of the second subject and the spectral data of the third subject at the first wavelength and the second wavelength, and the intensity characteristics of the spectral data of the first subject and the spectral data of the third subject at the first wavelength and the second wavelength, are calculated, and in the data conversion processing, the two or more intensity characteristics are converted into two or more discrimination data.

A tenth aspect of the present invention relates to an optical element comprising a first wavelength selection element, and a second wavelength selection element, in which the first wavelength selection element transmits a wavelength range of the first wavelength specified by the data processing apparatus according to any one of the sixth to eighth aspects, and the second wavelength selection element transmits a wavelength range of the second wavelength specified by the data processing apparatus according to any one of the sixth to eighth aspects.

An eleventh aspect of the present invention relates to an imaging optical system comprising the optical element according to the tenth aspect that is disposed at a pupil position or in a vicinity of the pupil position.

A twelfth aspect of the present invention relates to an imaging apparatus comprising the imaging optical system according to the eleventh aspect of the present invention, and an imaging element that captures a first optical image transmitted through the first wavelength selection element and a second optical image transmitted through the second wavelength selection element, which are image-formed by the imaging optical system.

A thirteenth aspect of the present invention relates to a data processing method comprising a data acquisition step of acquiring spectral data of a plurality of subjects, a calculation step of calculating intensity characteristics at a first wavelength and a second wavelength selected from wavelength ranges of the acquired spectral data of the plurality of subjects based on a relationship between two wavelengths which are the first wavelength and the second wavelength, a data conversion step of converting the intensity characteristics calculated in the calculation step into discrimination data of a specific subject for the wavelength range, and an output step of outputting the discrimination data to an outside, in which a processor executes processing of the respective steps.

In the data processing method according to a fourteenth aspect of the present invention, it is preferable that the intensity characteristic is an intensity difference and/or an intensity ratio.

In the data processing method according to a fifteenth aspect of the present invention, it is preferable that, in a case in which spectral data of a first subject in the spectral data of the plurality of subjects is denoted by A(λ), spectral data of a second subject in the spectral data of the plurality of subjects is denoted by B(λ), and the first wavelength and the second wavelength, which are to be selected, are denoted by λ1 and λ2, respectively, the intensity difference and/or the intensity ratio is calculated by the following expression of [Math. 1] and/or expression of [Math. 2].

$$\text{Intensity difference} = \left| \frac{A(\lambda 1) - A(\lambda 2)}{A(\lambda 1) + A(\lambda 2)} - \frac{B(\lambda 1) - B(\lambda 2)}{B(\lambda 1) + B(\lambda 2)} \right| \quad \text{[Math. 1]}$$

$$\text{Intensity ratio} = \left| \frac{A(\lambda 1) - A(\lambda 2)}{A(\lambda 1) + A(\lambda 2)} \middle/ \frac{B(\lambda 1) - B(\lambda 2)}{B(\lambda 1) + B(\lambda 2)} \right| \quad \text{[Math. 2]}$$

In the data processing method according to a sixteenth aspect of the present invention, it is preferable that the discrimination data is a first map representing a change in the intensity characteristic with a wavelength as a variable.

In the data processing method according to a seventeenth aspect of the present invention, it is preferable that the first map is a two-dimensional map, and coordinate axes of the two-dimensional map are the first wavelength and the second wavelength.

In the data processing method according to an eighteenth aspect of the present invention, it is preferable that a destination of the output of the discrimination data to the outside is a display device, and the data processing method further comprises a step of receiving a specific position on the first map displayed on the display device in response to a user indication, and a specifying step of specifying a wavelength combination of the first wavelength and the second wavelength to be used for detection of a detection object among the plurality of subjects based on the specific position.

It is preferable that the data processing method according to a nineteenth aspect of the present invention further comprises a step of extracting one or a plurality of positions on the first map at which the intensity characteristic exceeds a threshold value from the first map, and a specifying step of specifying one or a plurality of wavelength combinations of the first wavelength and the second wavelength to be used for the detection of the detection object among the plurality of subjects based on the extracted positions.

In the data processing method according to a twentieth aspect of the present invention, it is preferable that a destination of the output of the discrimination data to the outside is a display device, and the data processing method further comprises a step of displaying candidates for a specific position in the one or plurality of wavelength combinations of the first wavelength and the second wavelength in a superimposed manner on the first map displayed on the display device, a step of receiving the specific position from among the candidates for the specific position in response to a user indication, and a step of specifying the wavelength combination of the first wavelength and the second wavelength based on the received specific position.

In the data processing method according to a twenty-first aspect of the present invention, it is preferable that the plurality of subjects include a first subject, a second subject, and a third subject, in the data acquisition step, spectral data of the first subject, spectral data of the second subject, and spectral data of the third subject are acquired, in the calculation step, two or more intensity characteristics, out of the intensity characteristics of the spectral data of the first subject and the spectral data of the second subject at the first wavelength and the second wavelength, the intensity characteristics of the spectral data of the second subject and the spectral data of the third subject at the first wavelength and the second wavelength, and the intensity characteristics of the spectral data of the first subject and the spectral data of the third subject at the first wavelength and the second wavelength, are calculated, and in the data conversion step, the two or more intensity characteristics are converted into two or more discrimination data.

It is preferable that the data processing method according to a twenty-second aspect of the present invention further comprises an image acquisition step of acquiring a first image in a wavelength range including the first wavelength in the specified wavelength combination and a second image in a wavelength range including the second wavelength, a step of calculating a difference or a ratio between the first image and the second image, which are acquired, and a second map creation step of creating a second map showing the calculated difference or ratio.

In the data processing method according to a twenty-third aspect of the present invention, it is preferable that, in the specifying step, two or more wavelength combinations of the first wavelength and the second wavelength to be used for the detection of the detection object among the plurality of subjects are specified based on the first map, in the image acquisition step, the first image in the wavelength range including the first wavelength and the second image in the wavelength range including the second wavelength are acquired for each of the two or more wavelength combinations, in the second map creation step, the second map is created for each of the two or more wavelength combinations, and the data processing method further comprises a step of creating one second map by combining the created two or more second maps.

It is preferable that the data processing method according to a twenty-fourth aspect of the present invention further comprises a step of detecting the detection object based on the created second map.

A twenty-fifth aspect of the present invention relates to a data processing program causing a computer to realize a function of acquiring spectral data of a plurality of subjects, a function of calculating intensity characteristics at a first wavelength and a second wavelength selected from wavelength ranges of the acquired spectral data of the plurality of subjects based on a relationship between two wavelengths which are the first wavelength and the second wavelength, a function of converting the calculated intensity characteristics into discrimination data of a specific subject for the wavelength range, and a function of outputting the discrimination data to an outside.

BRIEF DESCRIPTION OF THE DRAWINGS

FIG. 6 is a diagram showing an example of a second map showing a difference or a ratio between a first image and a second image acquired from a multispectral camera that images the subjects shown in FIG. 2.

FIG. 7 is a diagram showing a plurality of subjects including another detection object imaged by the hyperspectral camera.

FIG. 16 is a functional block diagram showing a second embodiment of the data processing apparatus according to the embodiment of the present invention.

DESCRIPTION OF THE PREFERRED EMBODIMENTS

Hereinafter, preferred embodiments of a data processing apparatus, a data processing method, and a data processing program, an optical element, an imaging optical system, and an imaging apparatus according to the embodiment of the present invention will be described with reference to the accompanying drawings.

First Embodiment of Data Processing Apparatus

Figure 1:
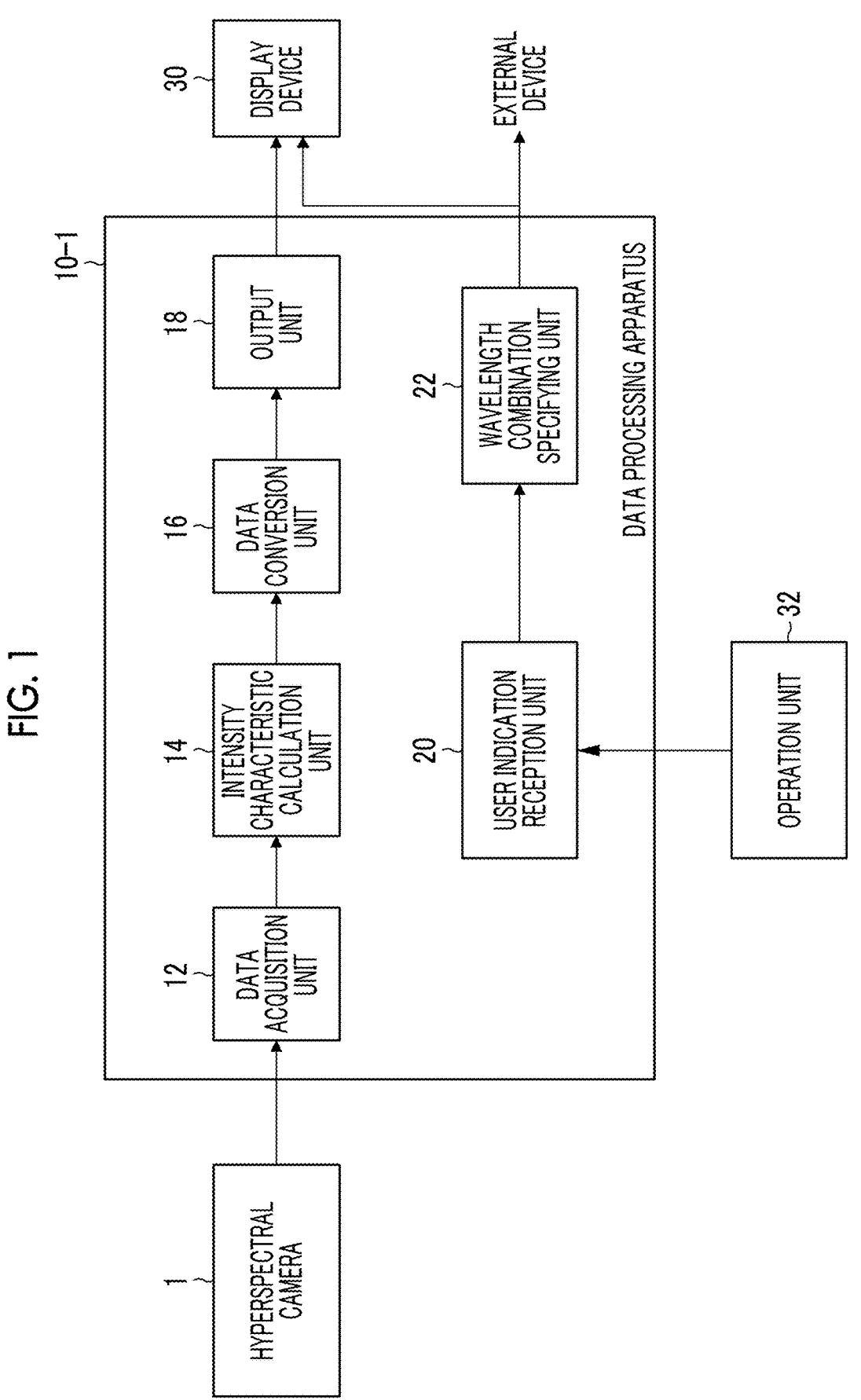
FIG. 1 is a functional block diagram showing a first embodiment of a data processing apparatus according to the embodiment of the present invention.

FIG. 1 is a functional block diagram showing a first embodiment of the data processing apparatus according to the embodiment of the present invention.

A data processing apparatus 10-1 according to the first embodiment can be configured by a personal computer, a workstation, or the like comprising hardware, such as a processor, a memory, and an input/output interface.

The processor is configured by a central processing unit (CPU) or the like, and controls each unit of the data processing apparatus 10-1 in an integrated manner to function as a data acquisition unit 12, an intensity characteristic calculation unit 14, a data conversion unit 16, an output unit 18, a user indication reception unit 20, and a wavelength combination specifying unit 22 shown in FIG. 1.

The data acquisition unit 12 executes data acquisition processing of acquiring spectral data of a plurality of subjects. In the present example, the data acquisition unit 12 acquires spectral data of the plurality of subjects directly from a hyperspectral camera 1 that images the plurality of subjects having different types of spectral reflectance from each other, or indirectly via a recording medium, a network, or the like.

Figure 2:
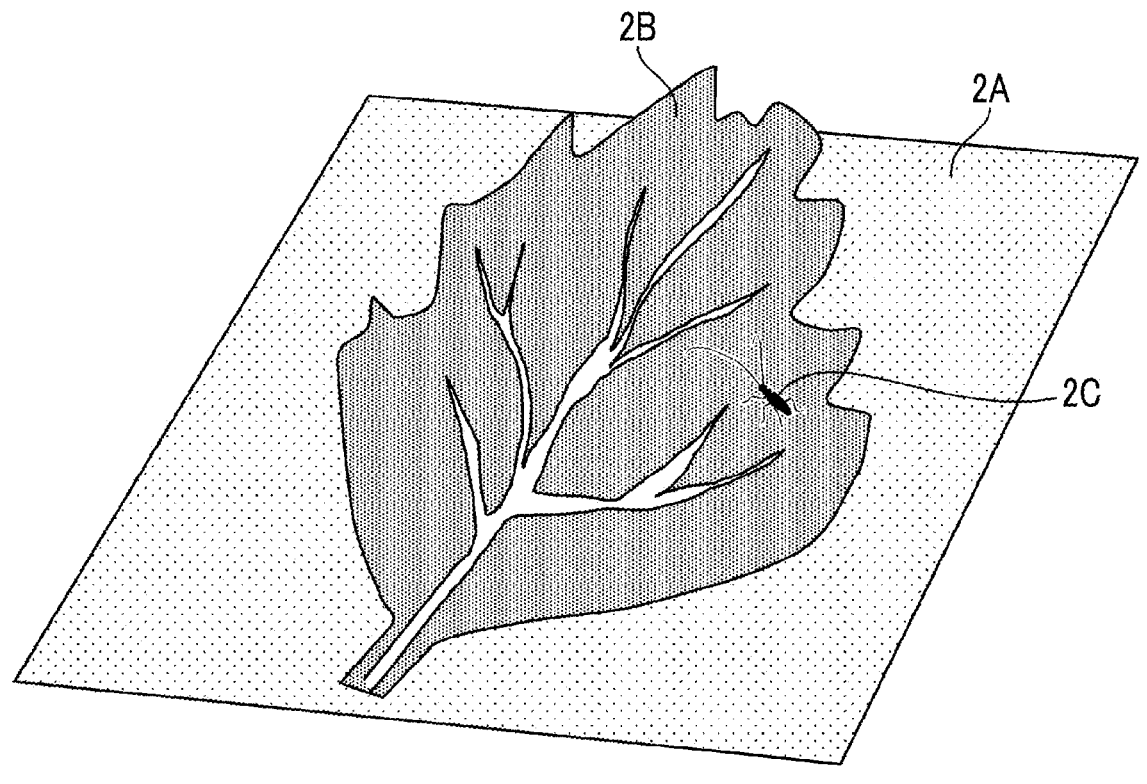
FIG. 2 is a diagram showing a plurality of subjects including a detection object imaged by a hyperspectral camera.

FIG. 2 is a diagram showing the plurality of subjects including a detection object imaged by the hyperspectral camera.

The plurality of subjects shown in FIG. 2 are three subjects which are paper 2A as a first subject, a leaf 2B as a second subject, and an insect 2C as a third subject. The leaf 2B is placed on the paper 2A, and the insect 2C is on the leaf 2B.

In a case in which each spectral data of the plurality of subjects is acquired from the hyperspectral camera 1, for example, the plurality of subjects shown in FIG. 2 are imaged by the hyperspectral camera 1, and the captured images are displayed on a monitor screen of the hyperspectral camera 1. Then, by a user indicating a region of the paper 2A, a region of the leaf 2B, and a region of the insect 2C on the monitor screen of the hyperspectral camera 1, the spectral data indicating the spectral reflectance of the paper 2A, the spectral data indicating the spectral reflectance of the leaf 2B, the spectral data indicating the spectral reflectance of the insect 2C are acquired from the hyperspectral camera 1.

In the present example, the insect 2C is the detection object, and the present invention relates to the technology of searching for a wavelength combination of two wavelengths in which a change in reflection or absorption is relatively large with respect to the subject on the background (paper 2A or leaf 2B) in order to detect the detection object (insect 2C).

Figure 3:
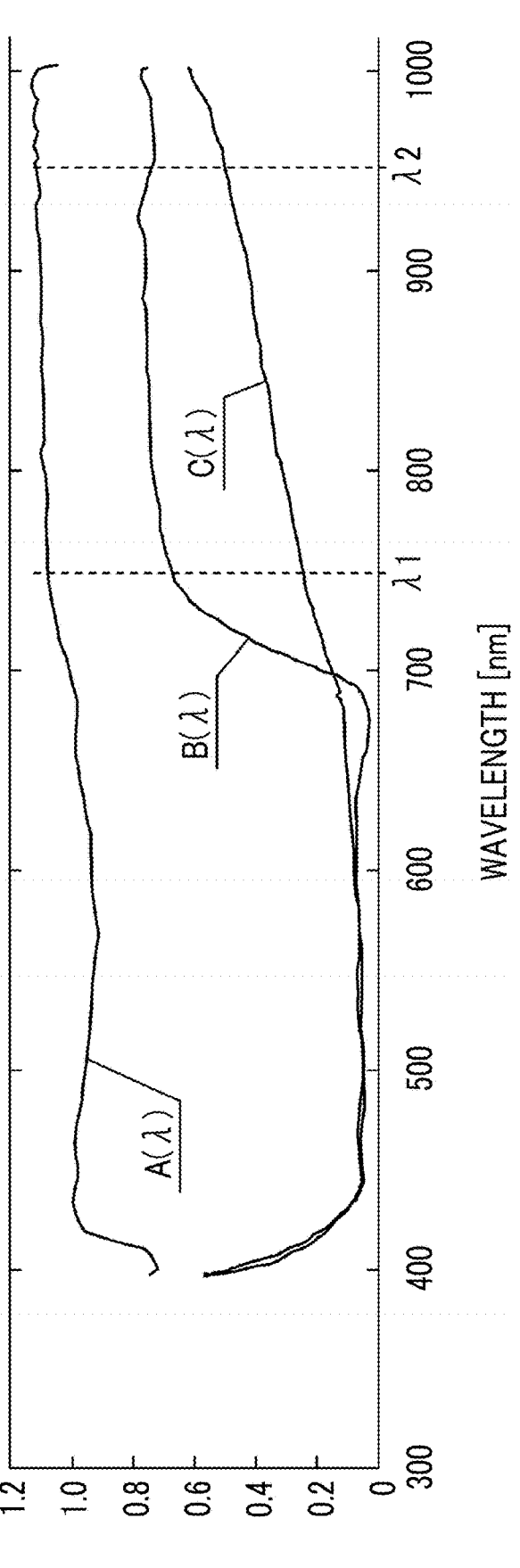
FIG. 3 is a graph showing spectral data of paper, a leaf, and an insect, respectively.

FIG. 3 is a graph showing the spectral data of the paper, the leaf, and the insect, respectively.

In FIG. 3, a vertical axis is a graph showing the spectral reflectance in a case in which the reflectance of a reference plate is 1. The spectral reflectance is an average value or a median value of the reflectance in the whole or a partial region of the detection object.

The data acquisition unit 12 acquires spectral data $A(\lambda)$ of the paper 2A shown in FIG. 3, spectral data $B(\lambda)$ of the leaf 2B, and spectral data $C(\lambda)$ of the insect 2C. It should be noted that the spectral data of each subject is not limited to a case of being acquired from the hyperspectral camera 1. For example, in a case in which the spectral data of the subject (including a part of the subject) is known, the known spectral data may be obtained.

The intensity characteristic calculation unit 14 executes calculation processing of calculating intensity characteristics at a first wavelength and a second wavelength selected from a wavelength range of the spectral data of the plurality of subjects acquired by the data acquisition unit 12 based on a relationship between two wavelengths which are the first wavelength and the second wavelength. The intensity characteristics at the first wavelength and the second wavelength is used to evaluate the sensing performance of the subject, and it is easier to discriminate the subject as the intensity characteristic is larger. It should be noted that the first wavelength and the second wavelength may have a width.

The intensity characteristic at the first wavelength and the second wavelength is an intensity difference and/or an intensity ratio in the spectral diffraction between the first wavelength and the second wavelength.

In a case in which the spectral data of the first subject (paper 2A) is denoted by $A(\lambda)$, the spectral data of the second subject (leaf 2B) is denoted by $B(\lambda)$, and the first wavelength and the second wavelength, which are to be combined, are denoted by $\lambda 1$ and $\lambda 2$, respectively, the intensity characteristic calculation unit 14 acquires the spectral reflectance data $A(\lambda 1)$ and $A(\lambda 2)$ from the spectral data $A(\lambda)$ of the paper 2A at the first wavelength $\lambda 1$ and the second wavelength $\lambda 2$, and acquires the spectral reflectance data $B(\lambda 1)$ and $B(\lambda 2)$ from the spectral data $B(\lambda)$ of the leaf 2B at the first wavelength $\lambda 1$ and the second wavelength $\lambda 2$ in the same manner.

In a case in which the intensity difference is calculated as the intensity characteristic, the intensity characteristic calculation unit 14 calculates an absolute value of a difference (difference in the relative spectral reflectance data between the paper 2A and the leaf 2B at two wavelengths which are the first wavelength $\lambda 1$ and the second wavelength $\lambda 2$) between a difference value between the spectral reflectance data $A(\lambda 1)$ and $A(\lambda 2)$ of the paper 2A at the first wavelength $\lambda 1$ and the second wavelength $\lambda 2$, and a difference value between the spectral reflectance data $B(\lambda 1)$ and $B(\lambda 2)$ of the leaf 2B at the first wavelength $\lambda 1$ and the second wavelength $\lambda 2$. In this case, in order to cancel the influence of the illumination unevenness, the shadow, or the like, it is preferable to divide the difference value by an addition value of the spectral reflectance data at the first wavelength $\lambda 1$ and the second wavelength $\lambda 2$.

Specifically, the intensity characteristic calculation unit 14 calculates the intensity difference by the following expression of [Math. 1] based on the spectral reflectance data $A(\lambda 1)$ and $A(\lambda 2)$ of the paper 2A and the spectral reflectance data $B(\lambda 1)$ and $B(\lambda 2)$ of the leaf 2B at the first wavelength $\lambda 1$ and the second wavelength $\lambda 2$.

$$\text{Intensity difference} = \left| \frac{A(\lambda 1) - A(\lambda 2)}{A(\lambda 1) + A(\lambda 2)} - \frac{B(\lambda 1) - B(\lambda 2)}{B(\lambda 1) + B(\lambda 2)} \right| \quad \text{[Math. 1]}$$

In a case in which the intensity characteristic calculation unit 14 calculates the intensity ratio as the intensity characteristic, the intensity ratio can be calculated by the following expression of [Math. 2].

$$\text{Intensity ratio} = \left| \frac{A(\lambda 1) - A(\lambda 2)}{A(\lambda 1) + A(\lambda 2)} \middle/ \frac{B(\lambda 1) - B(\lambda 2)}{B(\lambda 1) + B(\lambda 2)} \right| \quad \text{[Math. 2]}$$

In addition, the intensity characteristic calculation unit 14 calculates the intensity difference and/or the intensity ratio for each available wavelength combination of two wavelengths which are the first wavelength λ1 and the second wavelength λ2.

In the above-described example, the intensity difference and/or the intensity ratio for evaluating the sensing performance of the two subjects which are the paper 2A and the leaf 2B are calculated, but the intensity characteristic calculation unit 14 calculates the intensity difference and/or the intensity ratio for evaluating the sensing performance of the two subjects which are the leaf 2B and the insect 2C in the same manner. Further, in a case in which it is necessary to discriminate between the paper 2A and the insect 2C, the intensity difference and/or the intensity ratio for evaluating the sensing performance of the two subjects which are the paper 2A and the insect 2C is also calculated.

The intensity characteristic calculated by the intensity characteristic calculation unit 14 is output to the data conversion unit 16.

The data conversion unit 16 executes data conversion processing of converting the calculated intensity characteristic into discrimination data of a specific subject with respect to the wavelength range. The discrimination data is a map (first map) showing a change in the intensity characteristics with a wavelength as a variable.

The first map is a two-dimensional map, and coordinate axes of the two-dimensional map are the first wavelength and the second wavelength.

Figures 4A, 4B:
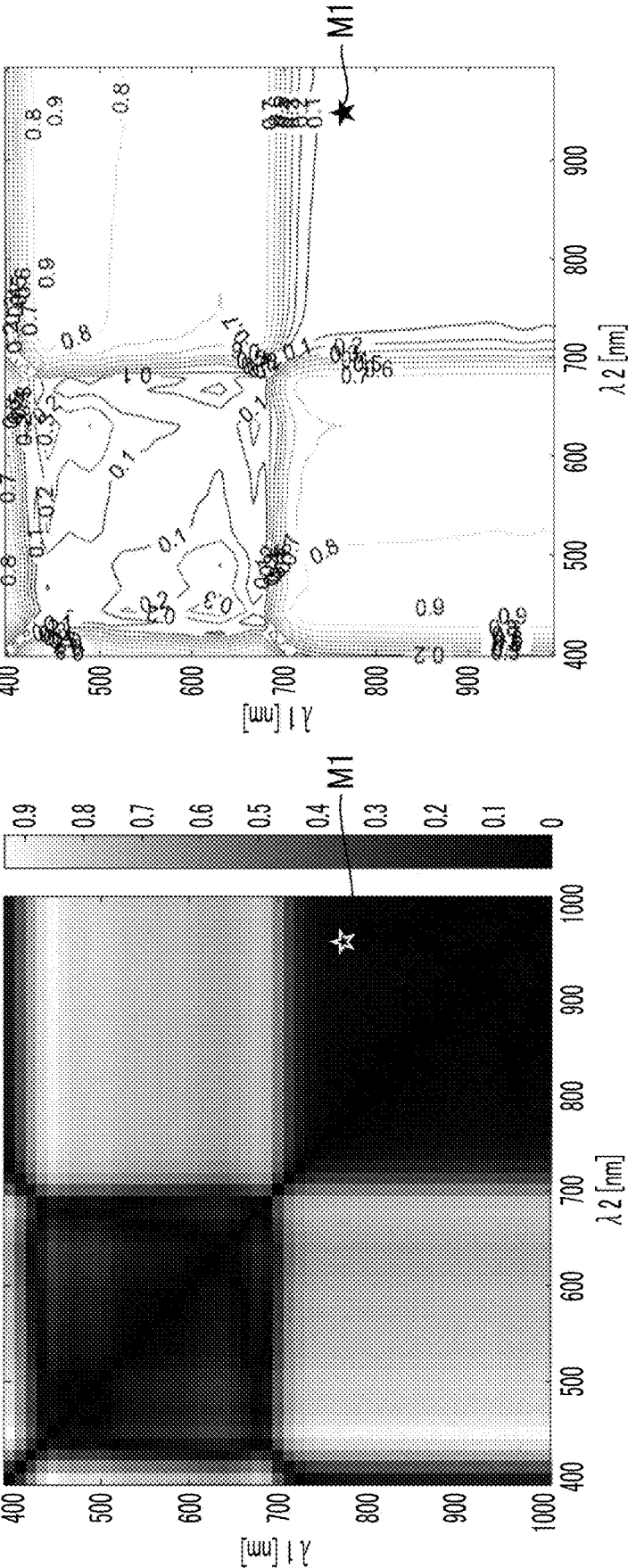
FIGS. 4A and 4B are diagrams showing examples of a first map showing an intensity distribution of intensity characteristics calculated from spectral data of the paper and the leaf.

FIGS. 4A and 4B are diagrams showing examples of the first map showing an intensity distribution of the intensity characteristics calculated from the spectral data of the paper and the leaf. The first map shown in FIG. 4A is a heat map in which colors and densities are added according to the magnitude of the intensity characteristic, and the first map shown in FIG. 4B is a contour diagram according to the magnitude of the intensity characteristic.

The intensity characteristic of the high-brightness (white) region is large on the first map (heat map) shown in FIG. 4A, and the intensity characteristic of the region of the contour having a large numerical value is large on the first map (contour diagram) shown in FIG. 4B.

Figures 5A, 5B:
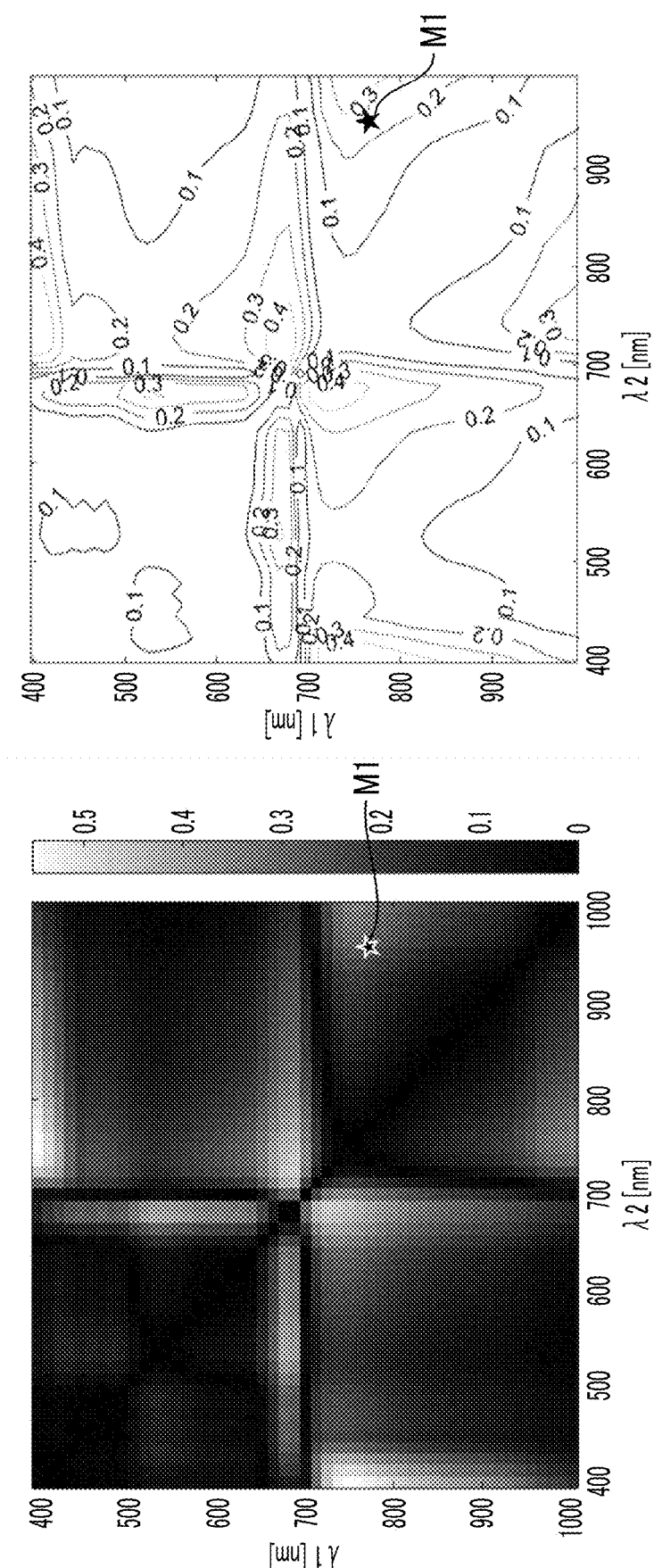
FIGS. 5A and 5B are diagrams showing examples of a first map showing an intensity distribution of intensity characteristics calculated from spectral data of the leaf and the insect.

FIGS. 5A and 5B are diagrams showing examples of the first map showing an intensity distribution of the intensity characteristics calculated from the spectral data of the leaf and the insect. The first map shown in FIG. 5A is a heat map in which colors and densities are added according to the magnitude of the intensity characteristic, and the first map shown in FIG. 5B is a contour diagram according to the magnitude of the intensity characteristic.

Two first maps (first maps shown in FIGS. 4A to 5B), which are the discrimination data converted by the data conversion unit 16, are added to the output unit 18.

The output unit 18 is an output processing unit that outputs the discrimination data (first map) input from the data conversion unit 16 to the outside. A destination of the output to the outside of the present example is the display device 30.

As a result, in a case of the present example, the first maps shown in FIGS. 4A to 5B are displayed on the display device 30.

The user indication reception unit 20 receives a specific position on the first map indicated by the user by an operation unit 32 of a pointing device, such as a mouse, operated by the user.

As described above, in the present example, since the insect 2C on the leaf 2B is the detection object, a position at which the paper 2A and the leaf 2B are not discriminated from each other (intensity characteristic is small) is preferable on the first map shown in FIGS. 4A and 4B, whereas a position at which the leaf 2B and the insect 2C are discriminated from each other (intensity characteristic is large) is preferable on the first map shown in FIGS. 5A and 5B.

The user finds the specific position at which the paper 2A and the leaf 2B are not discriminated from each other and the leaf 2B and the insect 2C are discriminated from each other, from the two first maps displayed on the display device 30, and indicates the specific position by the operation unit 32.

The user indication reception unit 20 receives the specific position on the first map indicated by the user in this way.

The wavelength combination specifying unit 22 has wavelength information of each coordinate axis of the first map, and specifies the wavelength combination of the first wavelength λ1 and the second wavelength λ2, which are the wavelength information of each coordinate axis indicated by the specific position in a case in which the specific position received by the user indication reception unit 20 is input.

In a case of the present example, on the first maps shown in FIGS. 4A to 5B, the specific position indicated by a marker M1 of an asterisk is indicated by the user, and as a result, the wavelength combination specifying unit 22 specifies the wavelength combination of the first wavelength λ1 (=750 nm) and the second wavelength λ2 (=950 nm).

The first wavelength λ1 (=750 nm) and the second wavelength λ2 (=950 nm) in the wavelength combination specified in this manner are wavelengths suitable for the detection of the insect 2C which is the detection object.

The first wavelength λ1 (=750 nm) and the second wavelength λ2 (=950 nm) specified by the wavelength combination specifying unit 22 are output to and displayed on the display device 30, and can be output to a recording device or other external devices.

In a case in which the wavelength combination of the first wavelength λ1 and the second wavelength λ2 suitable for the detection of the detection object is specified as described above, the plurality of subjects including the detection object are imaged by a multispectral camera including a first wavelength selection element (first bandpass filter) that transmits light in a wavelength range including the first wavelength λ1 and a second wavelength selection element (second bandpass filter) that transmits light in a wavelength range including the second wavelength λ2, and a first image in the wavelength range including the first wavelength λ1 and a second image in the wavelength range including the second wavelength λ2 are simultaneously acquired.

It should be noted that, as shown in FIG. 2, the wavelength combination of the first wavelength λ1 and the second wavelength λ2 suitable for the detection of the insect 2C on the leaf 2B placed on the paper 2A is the first wavelength λ1 (=750 nm) and the second wavelength λ2 (=950 nm) in the above-described example.

Figures 6, 7:
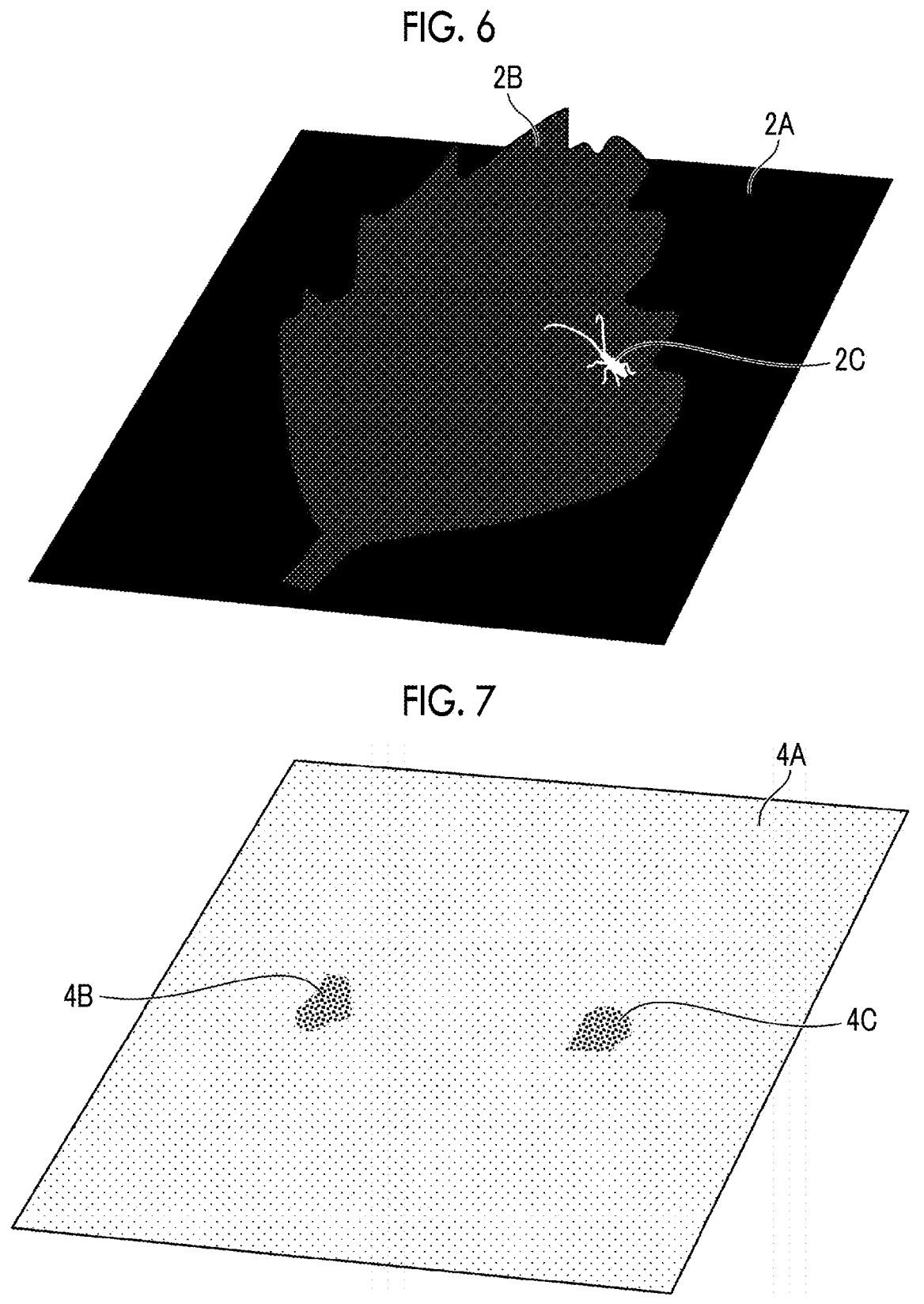

FIG. 6 is a diagram showing an example of a second map showing a difference or a ratio between the first image and the second image acquired from the multispectral camera that images the subjects shown in FIG. 2.

In the second map shown in FIG. 6, the contrast between the insect 2C, and the paper 2A and the leaf 2B on the background is clear, and the insect 2C can be detected with high accuracy by using the second map.

<Other Detection Objects>

FIG. 7 is a diagram showing a plurality of subjects including another detection object imaged by the hyperspectral camera.

In the plurality of subjects shown in FIG. 7, two types of soil 4B and 4C in a powder form are placed on a paper 4A on the background. The soil 4B is soil of an OK quality, and the soil 4C is soil of an NG quality.

The data acquisition unit 12 (FIG. 1) acquires the spectral data of each of the two types of soil 4B and 4C from the hyperspectral camera 1.

Figure 8:
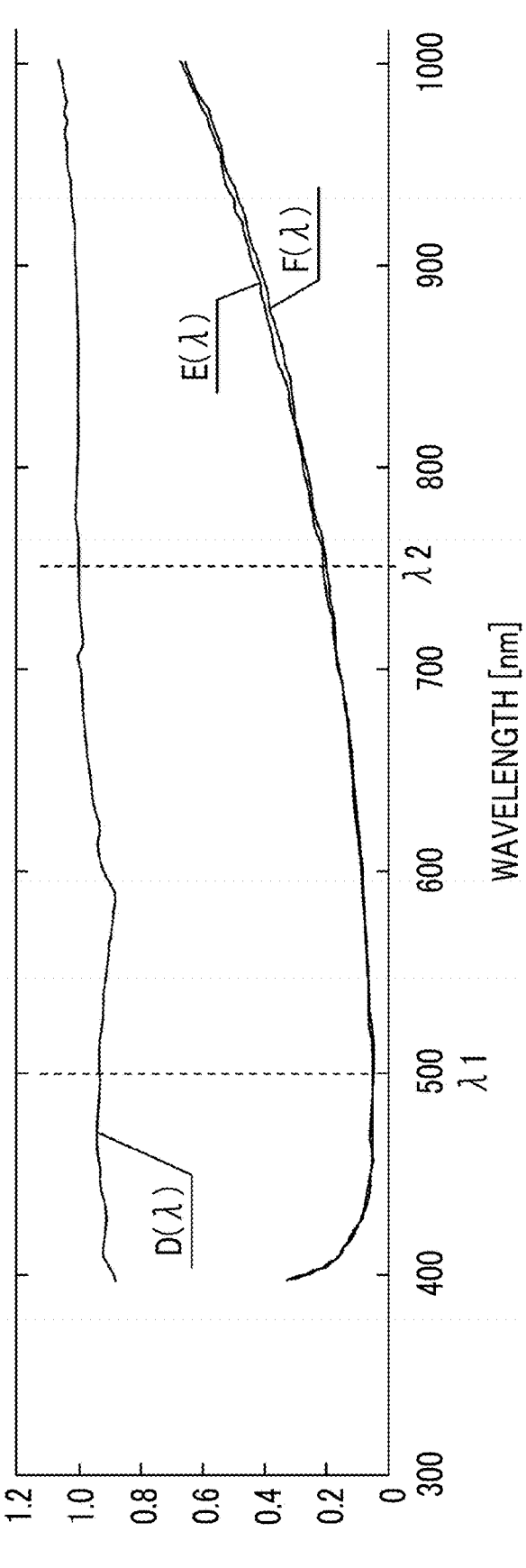
FIG. 8 is a graph showing spectral data of the paper and two types of soil in a powder form, respectively.

FIG. 8 is a graph showing the spectral data of the paper and the two types of soil in a powder form, respectively.

In FIG. 8, a vertical axis is a graph showing the spectral reflectance in a case in which the reflectance of a reference plate is 1. The spectral reflectance is an average value or a median value of the reflectance in the whole or a partial region of the detection object.

In FIG. 8, D($\lambda$) represents the spectral data of the paper 4A, E($\lambda$) represents the spectral data of the soil 4B, and F($\lambda$) represents the spectral data of the soil 4C.

As shown in FIG. 8, the spectral data E($\lambda$) and F($\lambda$) of the two types of soil 4B and 4C substantially match, and it is difficult to discriminate between the two types of soil 4B and 4C with the naked eye.

The intensity characteristic calculation unit 14 calculates the intensity characteristics at the first wavelength $\lambda 1$ and the second wavelength $\lambda 2$ selected from the wavelength ranges of the spectral data E($\lambda$) and F($\lambda$) of the soil 4B and 4C based on a relationship between two wavelengths which are the first wavelength $\lambda 1$ and the second wavelength $\lambda 2$, and the data conversion unit 16 converts the calculated intensity characteristics into the first maps.

Figures 9A, 9B:
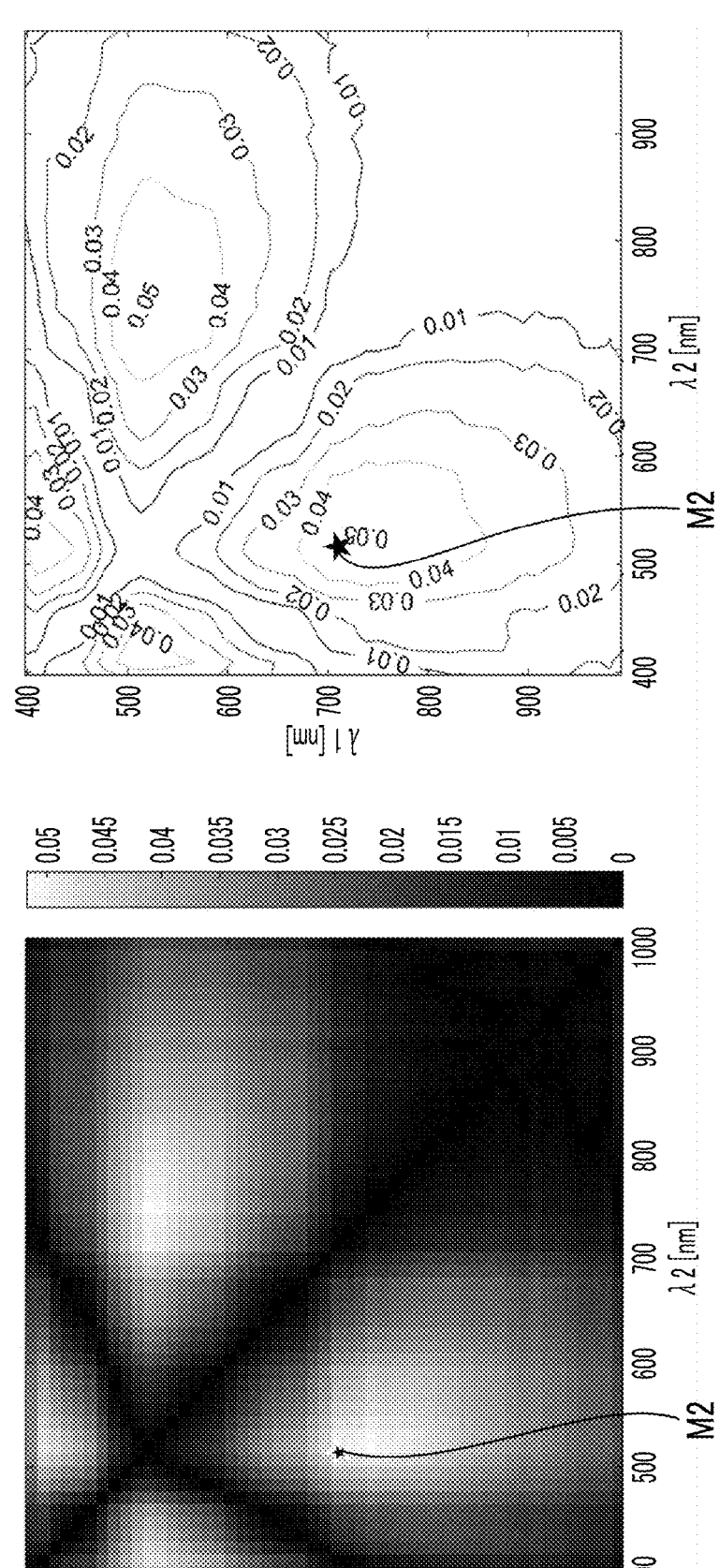
FIGS. 9A and 9B are diagrams showing examples of a first map showing an intensity distribution of intensity characteristics calculated from spectral data of the two types of soil.

FIGS. 9A and 9B are diagrams showing examples of a first map showing an intensity distribution of the intensity characteristics calculated from the spectral data of the two types of soil. The first map shown in FIG. 9A is a heat map in which colors and densities are added according to the magnitude of the intensity characteristic, and the first map shown in FIG. 9B is a contour diagram according to the magnitude of the intensity characteristic.

On the first maps shown in FIGS. 9A and 9B, the specific position at which the intensity characteristic is large is indicated by the user. It should be noted that, in FIGS. 9A and 9B, the specific position indicated by the user is a position to which a marker M2 of an asterisk is added.

The wavelength combination specifying unit 22 specifies the wavelength combination of the first wavelength $\lambda 1$ (=515 nm) and the second wavelength $\lambda 2$ (=730 nm) from the specific position indicated by the marker M2.

The plurality of subjects including the detection objects shown in FIG. 7 are imaged by the multispectral camera including the first bandpass filter that transmits light in the wavelength range (for example, 490 nm to 540 nm) including the specified first wavelength $\lambda 1$ (=515 nm) and the second bandpass filter that transmits light in the wavelength range (for example, 700 nm to 760 nm) including the second wavelength $\lambda 2$ (=730 nm), and the first image in the wavelength range including the first wavelength $\lambda 1$ and the second image in the wavelength range including the second wavelength $\lambda 2$ are simultaneously acquired.

A difference or a ratio between the first image and the second image in each wavelength range acquired by the multispectral camera is calculated, and the second map showing the calculated difference or ratio is created.

Figure 10:
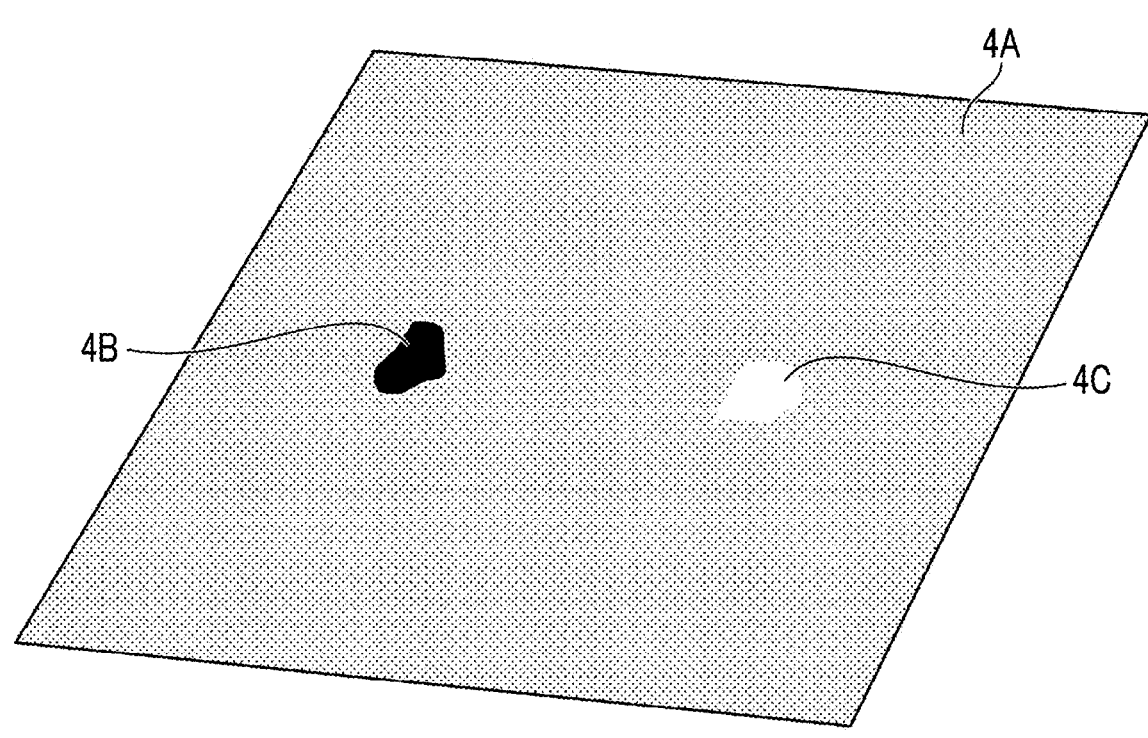
FIG. 10 is a diagram showing an example of a second map showing a difference or a ratio between a first image and a second image acquired from the multispectral camera that images the subjects shown in FIG. 7.

FIG. 10 is a diagram showing an example of the second map showing the difference or the ratio between the first image and the second image acquired from the multispectral camera that images the subjects shown in FIG. 7.

As an example of the second map, there is a method of expressing the difference between the first image and the second image as follows.

In a case in which the first image is defined as a wavelength image ($\lambda 1$) and the second image is defined as a wavelength image ($\lambda 2$), a difference image is calculated by (wavelength image ($\lambda 1$)−wavelength image ($\lambda 2$))÷(wavelength image ($\lambda 1$)+wavelength image ($\lambda 2$)), and this difference image is displayed as a heat map.

Further, a red (R) channel of R, green (G), and blue (B) color images is assigned to the wavelength image ($\lambda 1$), and a G channel is assigned to the wavelength image ($\lambda 2$) to express a pseudo-color image. It should be noted that whether the wavelength image ($\lambda 1$) or the wavelength image ($\lambda 2$) is assigned to any of the R channel, the G channel, and the B channel of the color images is not limited to the above-described example.

As described above, it is possible to easily discriminate between the subject of the detection object and the other subject from the heat map generated from the wavelength image ($\lambda 1$) and the wavelength image ($\lambda 2$) or the pseudo-color image.

In the second map shown in FIG. 10, the contrast between the soil 4B of the OK quality and the soil 4C of the NG quality is clear, and it is possible to easily discriminate between the soil 4B of the OK quality and the soil 4C of the NG quality by using the second map.

Figure 11:
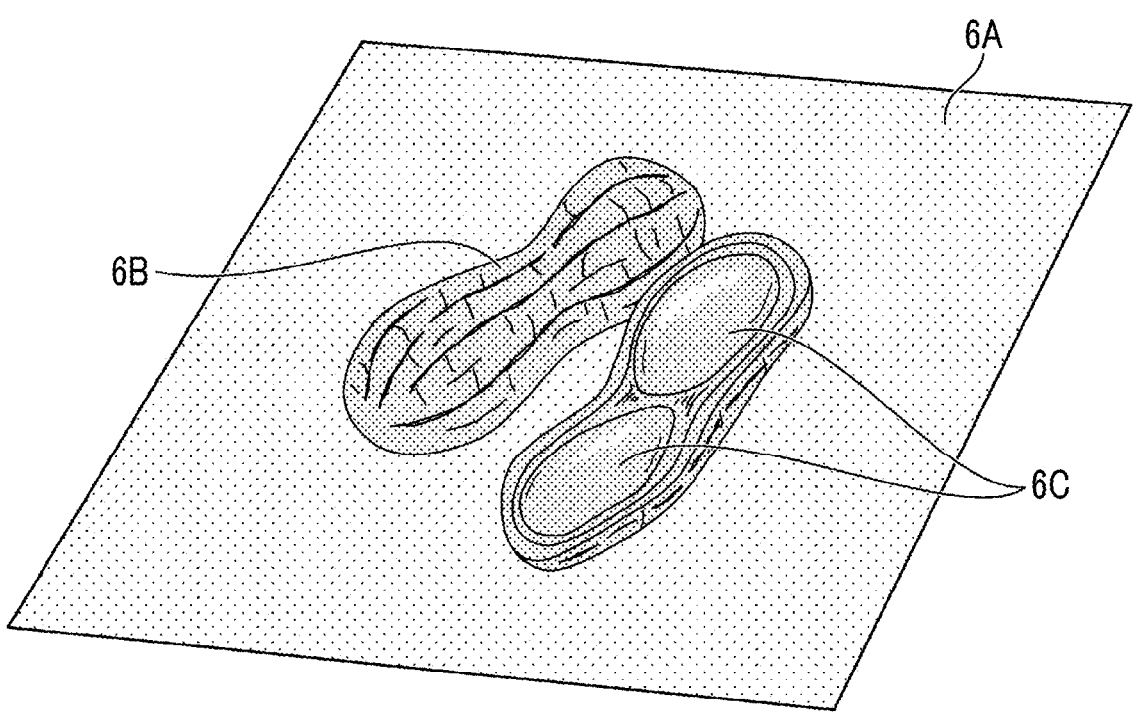
FIG. 11 is a diagram showing a plurality of subjects including still another detection object imaged by the hyperspectral camera.

FIG. 11 is a diagram showing a plurality of subjects including still another detection object imaged by the hyperspectral camera.

In the plurality of subjects shown in FIG. 11, a peanut skin 6B and a peanut nut 6C are placed on a paper 6A on the background.

The data acquisition unit 12 (FIG. 1) acquires the spectral data of each of the peanut skin 6B and the peanut nut 6C from the hyperspectral camera 1.

Figure 12:
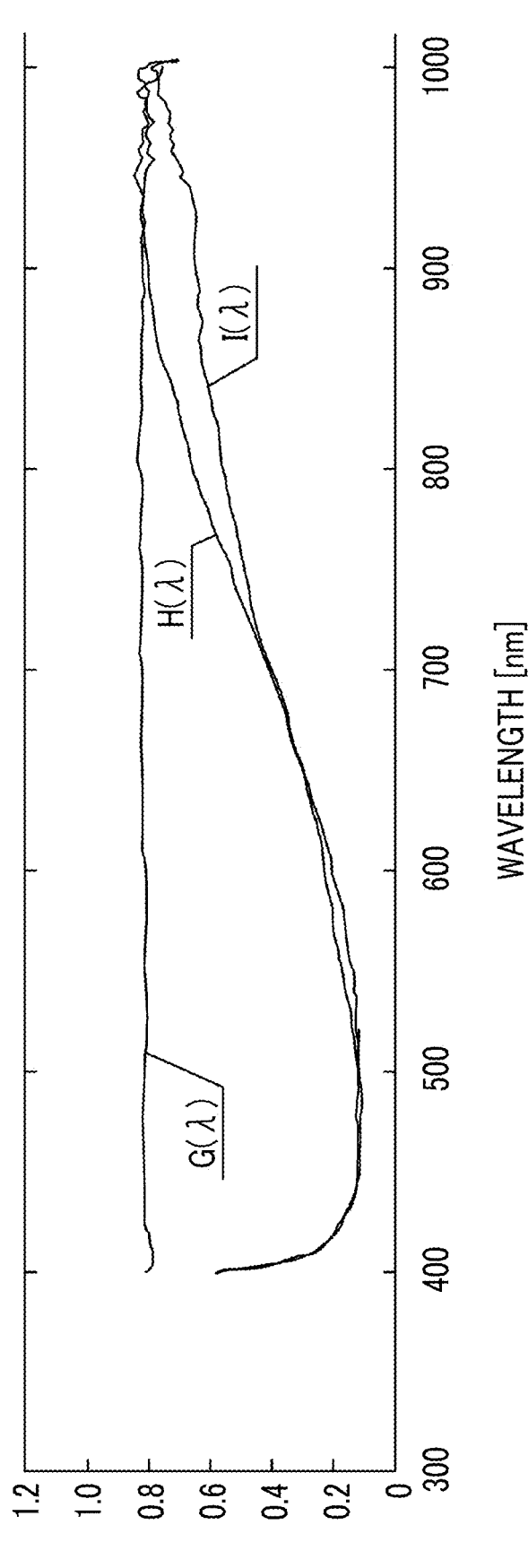
FIG. 12 is a graph showing spectral data of the paper, a peanut skin, and a peanut nut, respectively.

FIG. 12 is a graph showing the spectral data of the paper, the peanut skin, and the peanut nut, respectively.

In FIG. 12, a vertical axis is a graph showing the spectral reflectance in a case in which the reflectance of a reference plate is 1. The spectral reflectance is an average value or a median value of the reflectance in the whole or a partial region of the detection object.

In FIG. 12, G($\lambda$) indicates the spectral data of the paper 6A, H($\lambda$) indicates the spectral data of the peanut skin 6B, and I($\lambda$) indicates the spectral data of the peanut nut 6C. As shown in FIG. 12, the peanut skin 6B and the peanut nut 6C have substantially the same color, and it is difficult to discriminate between the peanut skin 6B and the peanut nut 6C with the naked eye.

The intensity characteristic calculation unit 14 calculates the intensity characteristics at the first wavelength $\lambda 1$ and the second wavelength $\lambda 2$ selected from the wavelength ranges of the spectral data H($\lambda$) and I($\lambda$) of the peanut skin 6B and the peanut nut 6C based on a relationship between two wavelengths which are the first wavelength $\lambda 1$ and the second wavelength $\lambda 2$, and the data conversion unit 16 converts the calculated intensity characteristics into the first maps.

Figures 13A, 13B:
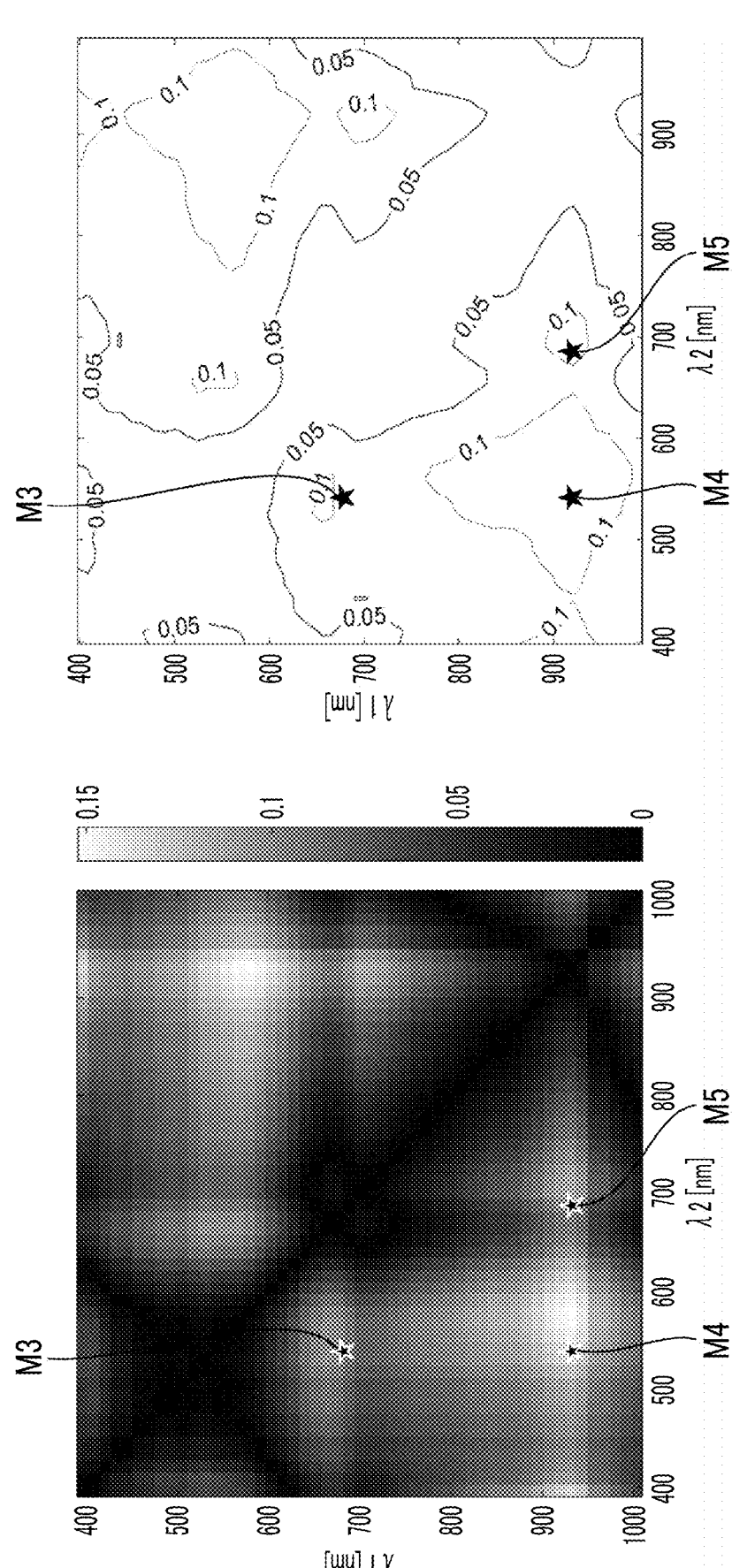
FIGS. 13A and 13B are diagrams showing examples of a first map showing an intensity distribution of intensity characteristics calculated from spectral data of the peanut skin and nut.

FIGS. 13A and 13B are diagrams showing examples of a first map showing an intensity distribution of the intensity characteristics calculated from the spectral data of the peanut skin and nut. The first map shown in FIG. 13A is a heat map in which colors and densities are added according to the magnitude of the intensity characteristic, and the first map shown in FIG. 13B is a contour diagram according to the magnitude of the intensity characteristic.

On the first map shown in FIGS. 13A and 13B, a plurality of specific positions are indicated by the user in order to enhance the sensing performance. It should be noted that, in FIGS. 13A and 13B, the plurality of (three places) specific positions indicated by the user are positions to which markers M3, M4, and M5 of asterisks are added.

The wavelength combination specifying unit 22 specifies the wavelength combination of the first wavelength $\lambda 1$ (=570 nm) and the second wavelength $\lambda 2$ (=690 nm) from the specific position indicated by the marker M3, specifies the wavelength combination of the first wavelength $\lambda 1$ (=570 nm) and the second wavelength $\lambda 2$ (=930 nm) from the specific position indicated by the marker M4, and specifies the wavelength combination of the first wavelength $\lambda 1$ (=690 nm) and the second wavelength $\lambda 2$ (=930 nm) from the specific position indicated by the marker M5.

In the above-described case, the wavelengths specified by the wavelength combination are three wavelengths (570 nm, 690 nm, and 930 nm). It should be noted that, in a case of the wavelength combination corresponding to the three specific positions, usually, six wavelengths (2 wavelengths× 3) are specified. However, in the present example, since the overlapping wavelengths are included in the wavelengths in the wavelength combination corresponding to the three specific positions, the three wavelengths (570 nm, 690 nm, and 930 nm) are specified.

The plurality of subjects including the detection objects shown in FIG. 11 are imaged by the multispectral camera including the first bandpass filter that transmits light in the wavelength range including the wavelength (570 nm) specified in this way, the second bandpass filter that transmits light in the wavelength range including the wavelength (690 nm), and a third bandpass filter that transmits light in the wavelength range including the wavelength (930 nm), and the first image in the wavelength range including the wavelength (570 nm), the second image in the wavelength range including the wavelength (690 nm), the third image in the wavelength range including the wavelength (930 nm) are simultaneously acquired.

Out of the first image, the second image, and the third image of the respective wavelength ranges acquired by the multispectral camera, a difference or a ratio between the first image and the second image, a difference or a ratio between the first image and the third image, and a difference or a ratio between the second image and the third image are calculated, respectively, and three second maps showing the calculated differences or ratios are created.

Figure 14:
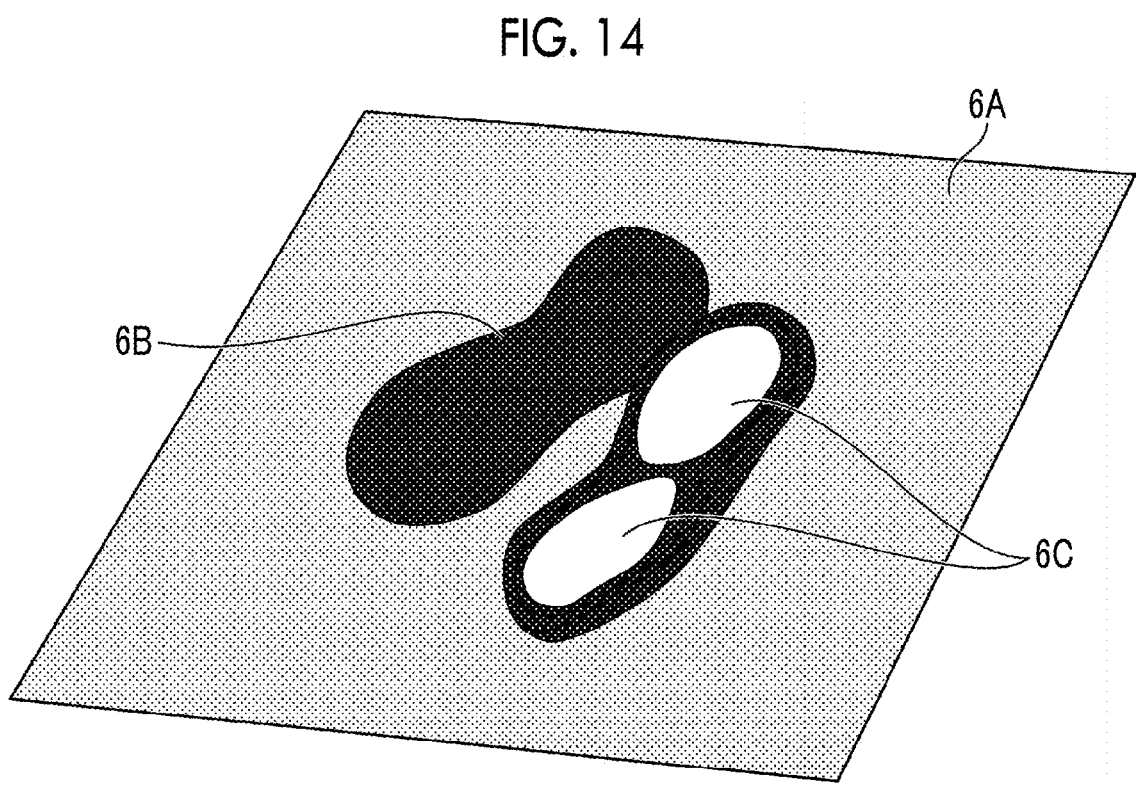
FIG. 14 is a diagram showing an example of one second map in which three second maps created from a first image, a second image, and a third image acquired from the multispectral camera that images the subjects shown in FIG. 11 are combined.

FIG. 14 is a diagram showing an example of one second map in which the three second maps created from the first image, the second image, and the third image acquired from the multispectral camera that images the subjects shown in FIG. 11 are combined.

Figure 15:
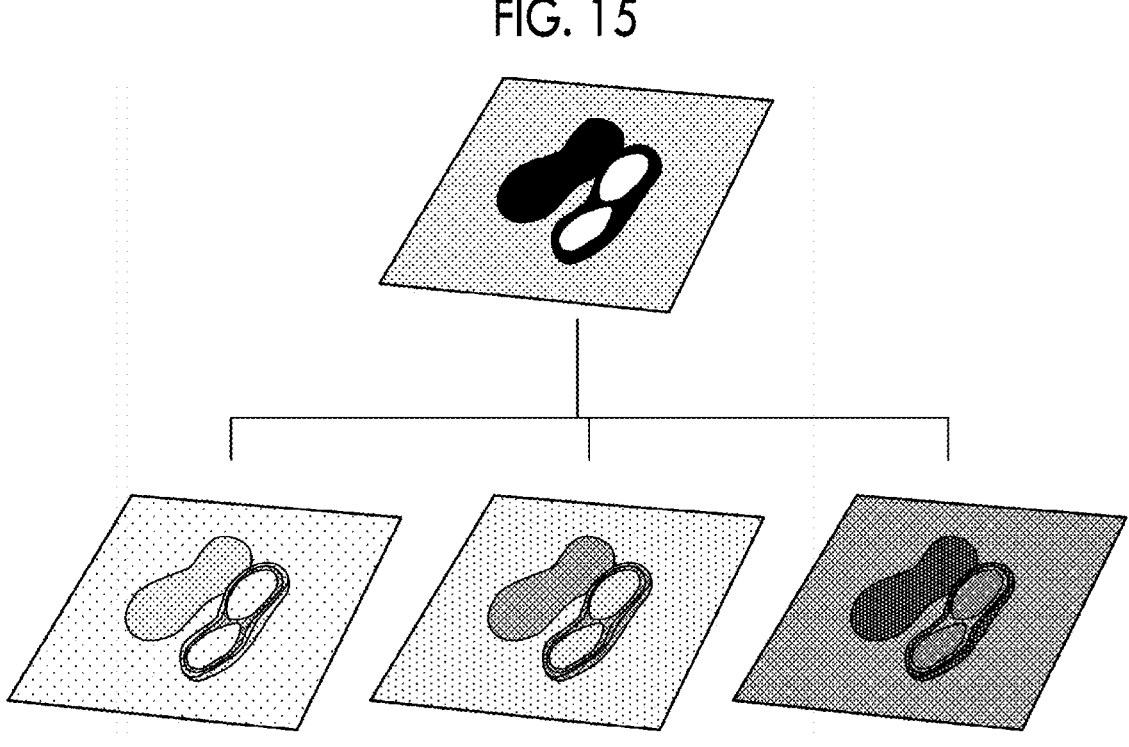
FIG. 15 is a diagram showing a state in which three second maps are combined to create one second map.

FIG. 15 is a diagram showing a state in which the three second maps are combined to create one second map.

By combining the plurality of second maps in this manner and finally creating one second map, it is possible to create the second map in which a dynamic range is expanded and the sensing performance is enhanced.

Second Embodiment of Data Processing Apparatus

Figure 16:
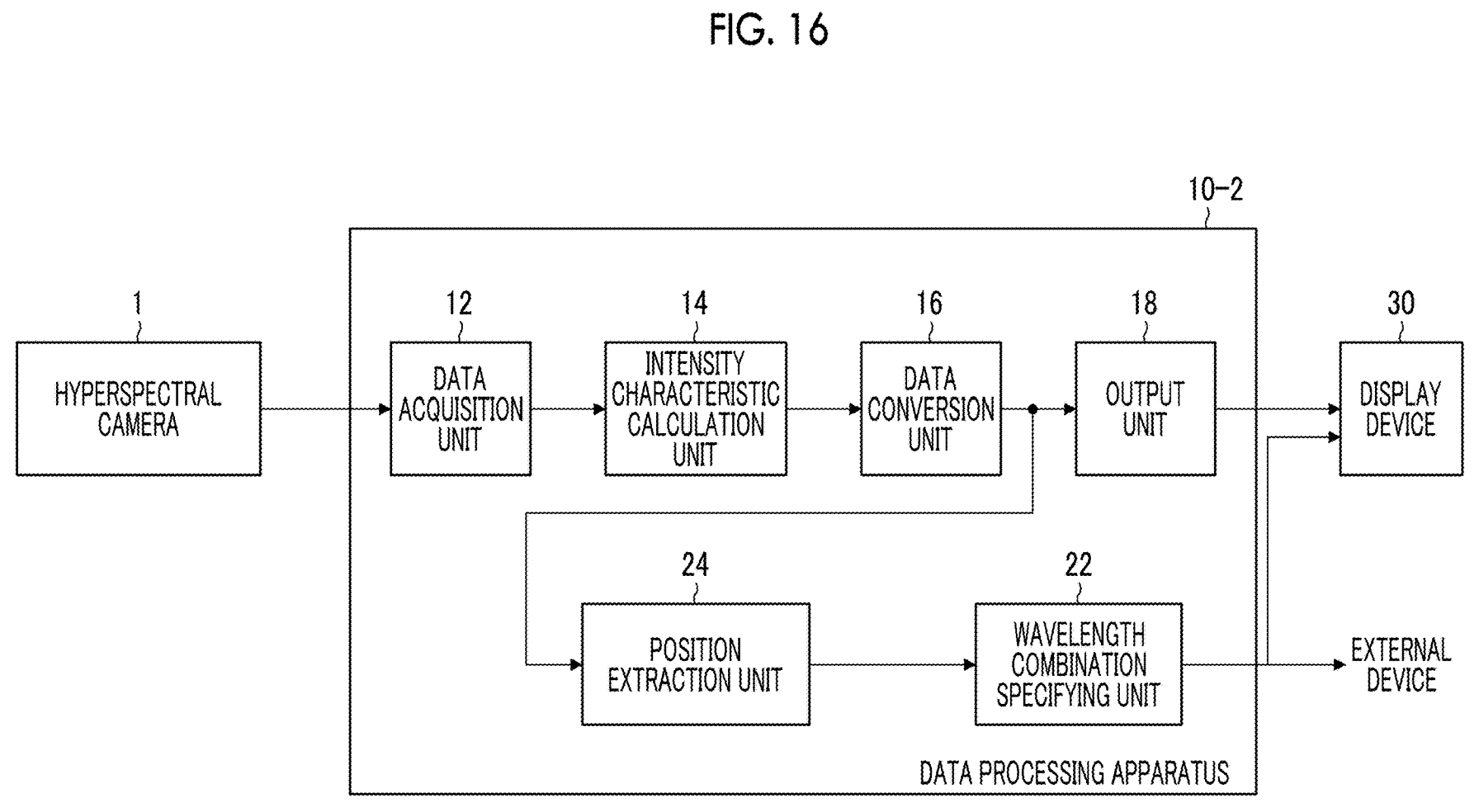

FIG. 16 is a functional block diagram showing a second embodiment of the data processing apparatus according to the embodiment of the present invention.

It should be noted that, in FIG. 16, the same reference numerals are added to the portions common to the data processing apparatus 10-1 according to the first embodiment shown in FIG. 1, and the detailed description thereof will be omitted.

A data processing apparatus 10-2 according to the second embodiment shown in FIG. 16 is different from the data processing apparatus 10-1 according to the first embodiment in that a position extraction unit 24 is provided instead of the user indication reception unit 20 of the data processing apparatus 10-1 according to the first embodiment.

The first map showing the intensity distribution of the intensity characteristic is added to the position extraction unit 24 from the data conversion unit 16, and the position extraction unit 24 executes processing of extracting one or a plurality of positions on the first map at which the intensity characteristic exceeds a threshold value from the first map.

For example, the position extraction unit 24 can detect one or a plurality of regions in which the intensity characteristic exceeds the threshold value on the first map and obtain the position of the centroid of the detected regions to extract the one or plurality of position on the first map. In addition, a position having the highest intensity characteristic in the one or plurality of regions exceeding the threshold value may be set as a position in the region.

Information on the position (coordinate information on the first map) extracted by the position extraction unit 24 is output to the wavelength combination specifying unit 22.

The wavelength combination specifying unit 22 has wavelength information of each coordinate axis of the first map, and specifies the wavelength combination of the first wavelength $\lambda 1$ and the second wavelength $\lambda 2$, which are the wavelength information of each coordinate axis indicated by the specific position in a case in which the position (specific position) extracted by the position extraction unit 24 is input.

The wavelength combinations (first wavelength $\lambda 1$ and second wavelength $\lambda 2$) specified by the wavelength combination specifying unit 22 are output to and displayed on the display device 30, and can be output to a recording device or other external devices. In a case in which two or more wavelength combinations are specified, the output is executed for each specified wavelength combination.

In addition, as a modification example of the data processing apparatus 10-1 according to the first embodiment and the data processing apparatus 10-2 according to the second embodiment, the data processing apparatus 10-2 according to the second embodiment may specify candidates for the plurality of specific positions (plurality of wavelength combinations), may display the candidates for the specific position in a superimposed manner on the first map, and may specify one or two or more specific positions by the user indication from among the candidates for the specific position displayed in a superimposed manner on the first map.

[Multispectral Camera]

Figure 17:
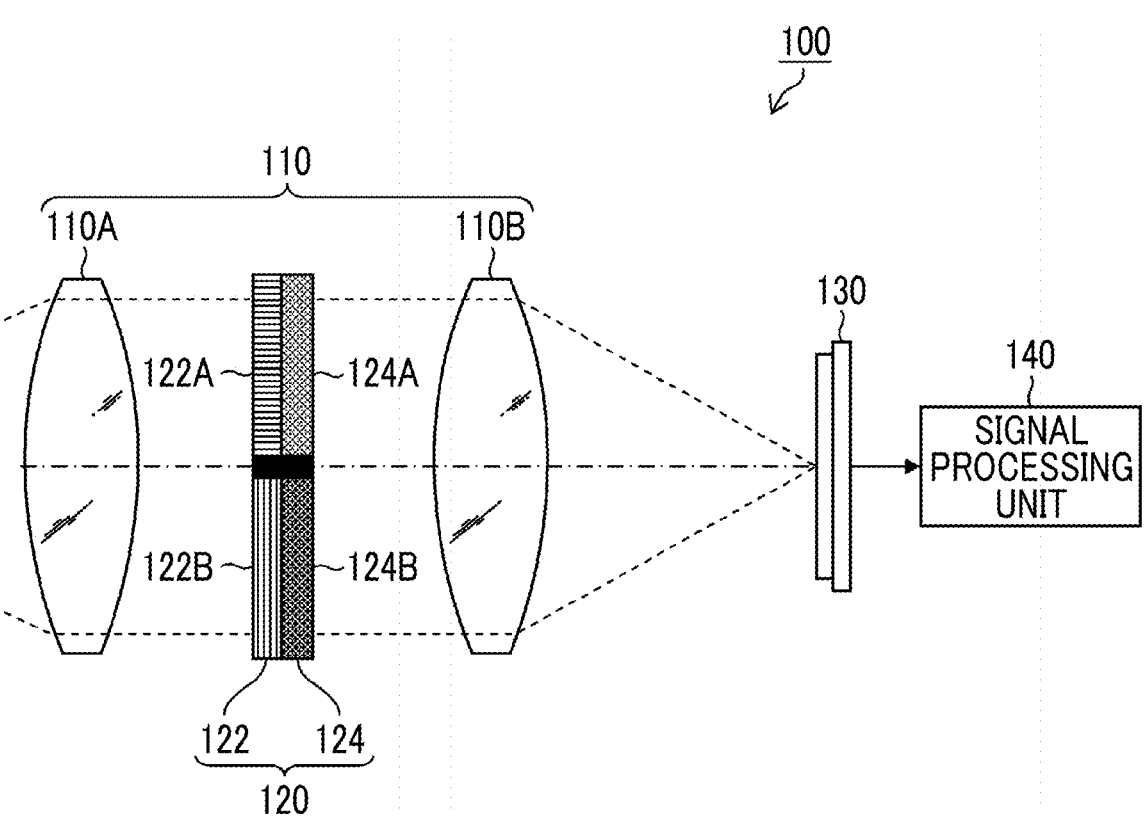
FIG. 17 is a schematic diagram showing an example of a multispectral camera.

FIG. 17 is a schematic diagram showing an example of the multispectral camera.

A multispectral camera (imaging apparatus) 100 shown in FIG. 17 includes an imaging optical system 110 including lenses 110A and 110B and a filter unit 120, an image sensor 130, and a signal processing unit 140.

It is preferable that the filter unit 120 is composed of a polarizing filter unit 122 and a bandpass filter unit 124, and is disposed at a pupil position of the imaging optical system 110 or in the vicinity of the pupil position.

The polarizing filter unit 122 consists of a first polarizing filter 122A and a second polarizing filter 122B that linearly polarize light transmitted through a first pupil region and a second pupil region of the imaging optical system 110, respectively, and the first polarizing filter 122A and the second polarizing filter 122B have different polarization directions from each other by 90°.

The bandpass filter unit 124 consists of a first bandpass filter (first wavelength selection element) 124A and a second bandpass filter (second wavelength selection element) 124B that select the wavelength ranges of the light transmitted through the first pupil region and the second pupil region of the imaging optical system 110, respectively, the first bandpass filter 124A selects the wavelength range including one wavelength (first wavelength) in the specified wavelength combination, and the second bandpass filter 124B selects the wavelength range including the other wavelength (second wavelength) in the specified wavelength combination.

Therefore, the light transmitted through the first pupil region of the imaging optical system 110 is linearly polarized by the first polarizing filter 122A, and only the light in the wavelength range including the first wavelength is transmitted by the first bandpass filter 124A. On the other hand, the light transmitted through the second pupil region of the imaging optical system 110 is linearly polarized by the second polarizing filter 122B (linearly polarized in a direction different from that of the first polarizing filter 122A by 90°), and only the light in the wavelength range including the second wavelength is transmitted by the second bandpass filter 124B.

The image sensor 130 is configured such that the first polarizing filter and the second polarizing filter which have different polarization directions from each other by 90° are regularly disposed on a plurality of pixels consisting of photoelectric conversion elements arranged in a two-dimensional manner.

It should be noted that the first polarizing filter 122A and the first polarizing filter of the image sensor 130 have the same polarization direction, and the second polarizing filter 122B and the second polarizing filter of the image sensor 130 have the same polarization direction.

The signal processing unit 140 reads out a pixel signal from the pixel at which the first polarizing filter of the image sensor 130 is disposed, to acquire the first image in the wavelength range whose wavelength is selected by the first bandpass filter 124A, and reads out a pixel signal from the pixel at which the second polarizing filter of the image sensor 130 is disposed, to acquire the second image in the wavelength range whose wavelength is selected by the second bandpass filter 124B.

The first image and the second image acquired by the signal processing unit 140 are used to detect the detection object, as described above.

[Optical Element]

The optical element according to the embodiment of the present invention is an optical element manufactured according to the wavelength combination of the first wavelength and the second wavelength specified by the data processing apparatus 10-1 according to the first embodiment shown in FIG. 1 or the data processing apparatus 10-2 according to the second embodiment shown in FIG. 16.

That is, the optical element corresponds to the bandpass filter unit 124 disposed in the multispectral camera 100 shown in FIG. 17, and includes the first wavelength selection element (first bandpass filter) that transmits light in the wavelength range including the first wavelength specified by the data processing apparatus and the second wavelength selection element (second bandpass filter) that transmits light in the wavelength range including the second wavelength specified by the data processing apparatus.

It is preferable that the first bandpass filter and the second bandpass filter have the first wavelength and the second wavelength as central wavelengths, respectively, and have a bandwidth in which the wavelength ranges of the transmission wavelengths do not overlap with each other.

[Imaging Optical System]

The imaging optical system according to the embodiment of the present invention corresponds to the imaging optical system 110 of the multispectral camera 100 shown in FIG. 17. This imaging optical system is the optical element corresponding to the bandpass filter unit 124, and is configured such that the optical element including the first wavelength selection element (first bandpass filter) that transmits light in the wavelength range including the first wavelength specified by the data processing apparatus and the second wavelength selection element (second bandpass filter) that transmits light in the wavelength range including the second wavelength specified by the data processing apparatus is disposed at the pupil positions of the lenses 110A and 110B or in the vicinity of the pupil positions.

[Imaging Apparatus]

The imaging apparatus according to the embodiment of the present invention corresponds to, for example, the multispectral camera 100 shown in FIG. 17.

The multispectral camera 100 shown in FIG. 17 comprises the imaging optical system (imaging optical system in which the optical element according to the embodiment of the present invention is disposed at the pupil position or in the vicinity of the pupil position) 110 and the image sensor (imaging element) 130 that captures an optical image (first optical image and second optical image) image-formed by the imaging optical system 110.

The first optical image is the optical image transmitted through the first wavelength selection element of the optical element, and the second optical image is the optical image transmitted through the second wavelength selection element of the optical element.

The first optical image and the second optical image are pupil-split by the polarizing filter units 122 (first polarizing filter 122A and second polarizing filter 122B) that function as pupil splitting units, respectively, and the first polarizing filter and the second polarizing filter corresponding to the first polarizing filter 122A and the second polarizing filter 122B on each pixel of the image sensor 130, and are captured by the image sensor 130. As a result, the multispectral camera 100 can simultaneously acquire the first image corresponding to the first optical image and the second image corresponding to the second optical image, which have different wavelength ranges from each other.

It should be noted that the imaging apparatus is not limited to the imaging apparatus having a configuration such as the pupil splitting unit of the multispectral camera 100 shown in FIG. 17, and need only be the imaging apparatus that can capture at least the first optical image transmitted through the first wavelength selection element and the second optical image transmitted through the second wavelength selection element, and can acquire the first image and the second image corresponding to the first optical image and the second optical image.

[Data Processing Method]

The data processing method according to the embodiment of the present invention is a method related to the specifying of the wavelength combination of the first wavelength and the second wavelength suitable for the detection of a desired detection object, and is a method executed by the processor that is a main body of processing of each unit of the data processing apparatuses 10-1 and 10-2 shown in FIG. 1 and FIG. 16.

First Embodiment

Figure 18:
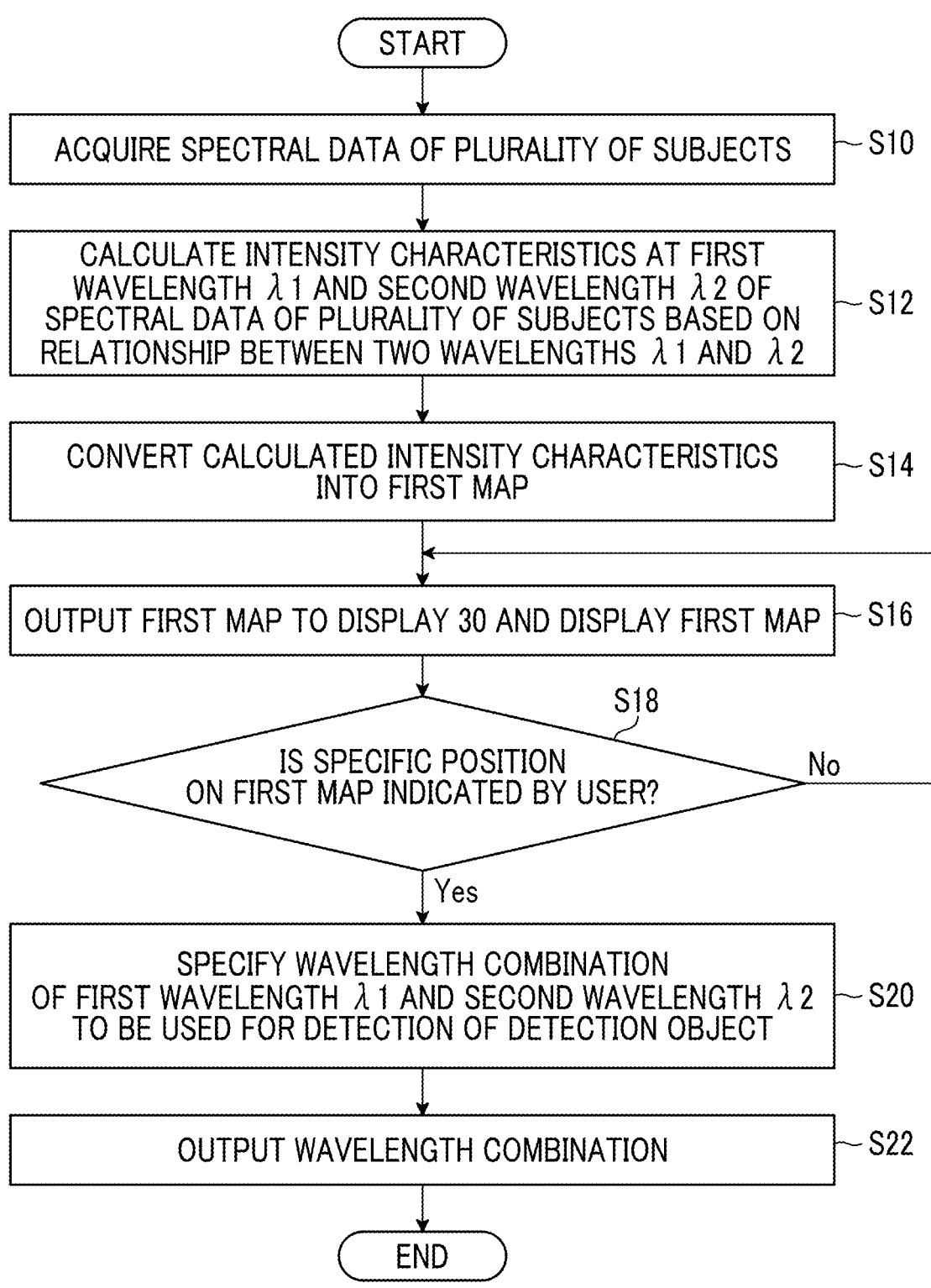
FIG. 18 is a flowchart showing a first embodiment of a data processing method according to the embodiment of the present invention.

FIG. 18 is a flowchart showing a first embodiment of the data processing method according to the embodiment of the present invention.

In FIG. 18, the processor acquires the spectral data of the plurality of subjects (step S10, data acquisition step). In step S10, for example, the spectral data of the plurality of subjects are acquired from the hyperspectral camera that images the plurality of subjects having different types of spectral reflectance from each other.

Now, as shown in FIG. 2, in a case in which the plurality of subjects are three subjects which are the paper 2A, the leaf 2B, and the insect 2C, the leaf 2B is placed on the paper 2A, and the insect 2C is on the leaf 2B, the three spectral data A(λ), B(λ), and C(λ) of the paper 2A, the leaf 2B, and the insect 2C are acquired (see FIG. 3).

Subsequently, the processor calculates the intensity characteristics at the first wavelength λ1 and the second wavelength λ2 selected from the wavelength ranges of the spectral data of the plurality of subjects acquired in step S10, based on the relationship between the two wavelengths which are the first wavelength λ1 and the second wavelength λ2 (step S12, calculation step).

The intensity characteristic at the first wavelength and the second wavelength is an intensity difference and/or an intensity ratio in the spectral diffraction between the first wavelength and the second wavelength.

In a case in which, in the spectral data A(λ) of the paper 2A and the spectral data B(λ) of the leaf 2B, the first wavelength and the second wavelength, which are to be combined, are denoted by λ1 and λ2, respectively, in step S12, the spectral reflectance data A(λ1) and A(λ2) are acquired from the spectral data A(λ) of the paper 2A at the first wavelength λ1 and the second wavelength λ2, and the spectral reflectance data B(λ1) and B(λ2) are acquired from the spectral data B(λ) of the leaf 2B at the first wavelength λ1 and the second wavelength λ2 in the same manner.

In a case in which the intensity difference is calculated as the intensity characteristic, an absolute value of the difference between the difference value between the spectral reflectance data A(λ1) and A(λ2) of the paper 2A at the first wavelength λ1 and the second wavelength λ2 and the difference value between the spectral reflectance data B(λ1) and B(λ2) of the leaf 2B at the first wavelength λ1 and the second wavelength λ2 is calculated. In a case in which the intensity ratio is calculated as the intensity characteristic, an absolute value of the ratio between the difference value between the spectral reflectance data A(λ1) and A(λ2) of the paper 2A at the first wavelength λ1 and the second wavelength λ2 and the difference value between the spectral reflectance data B(λ1) and B(λ2) of the leaf 2B at the first wavelength λ1 and the second wavelength λ2 is calculated.

Specifically, it is preferable to calculate the intensity difference or the intensity ratio by the expressions of [Math. 1] or [Math. 2].

Then, the processor converts the intensity characteristics calculated in step S12 into the discrimination data of the specific subject with respect to the wavelength range (step S14, data conversion step). Here, the discrimination data is the map (first map) showing the change in the intensity characteristics with a wavelength as a variable. In addition, the first map is the two-dimensional map, and the coordinate axes of the two-dimensional map are the first wavelength and the second wavelength.

FIGS. 4A and 4B are diagrams showing examples of the first map showing an intensity distribution of the intensity characteristics calculated from the spectral data of the paper and the leaf. The first map shown in FIG. 4A is a heat map in which colors and densities are added according to the magnitude of the intensity characteristic, and the first map shown in FIG. 4B is a contour diagram according to the magnitude of the intensity characteristic.

In addition, FIGS. 5A and 5B are diagrams showing examples of a first map showing an intensity distribution of intensity characteristics calculated from spectral data of the leaf and the insect. The first map shown in FIG. 5A is a heat map in which colors and densities are added according to the magnitude of the intensity characteristic, and the first map shown in FIG. 5B is a contour diagram according to the magnitude of the intensity characteristic.

Subsequently, the processor outputs the first map, which is the discrimination data converted in step S14, to the display device 30 (FIG. 1), which is the destination of the output to the outside (step S16, output step). As a result, in a case of the present example, the first maps shown in FIGS. 4A to 5B are displayed on the display device 30.

The processor determines whether or not the specific position on the first map is indicated by the user (step S18). It should be noted that the user can indicate the specific position (for example, a position having a large intensity characteristic) with a pointing device, such as a mouse, while viewing the first map displayed on the display device 30.

In the present example, since the insect 2C on the leaf 2B is the detection object, the position at which the paper 2A and the leaf 2B are not discriminated from each other (intensity characteristic is small) is preferable as the specific position indicated by the user on the first map shown in FIGS. 4A and 4B, whereas the position at which the leaf 2B and the insect 2C are discriminated from each other (intensity characteristic is large) is preferable on the first map shown in FIGS. 5A and 5B.

It is preferable that the user finds the specific position at which the paper 2A and the leaf 2B are not discriminated from each other and the leaf 2B and the insect 2C are discriminated from each other, from the two first maps displayed on the display device 30, and indicates the specific position.

In a case in which the specific position on the first map is indicated by the user (in a case of "Yes"), the processor specifies the wavelength combination of the first wavelength and the second wavelength to be used for the detection of the detection object among the plurality of subjects based on the specific position (step S20, specifying step). In the present example, from the specific position indicated by the marker M1 of the asterisk on the first maps shown in FIGS. 4A to 5B, the wavelength combination of the first wavelength λ1 (=750 nm) and the second wavelength λ2 (=950 nm) representing the coordinates of the specific position is specified.

The wavelength combination (750 nm and 950 nm) specified in this manner is the wavelength suitable for the detection of the insect 2C which is the detection object, and information indicating the wavelength combination is output to and displayed on the display device 30, and is output to a recording device or other external devices (step S22).

Second Embodiment

Figure 19:
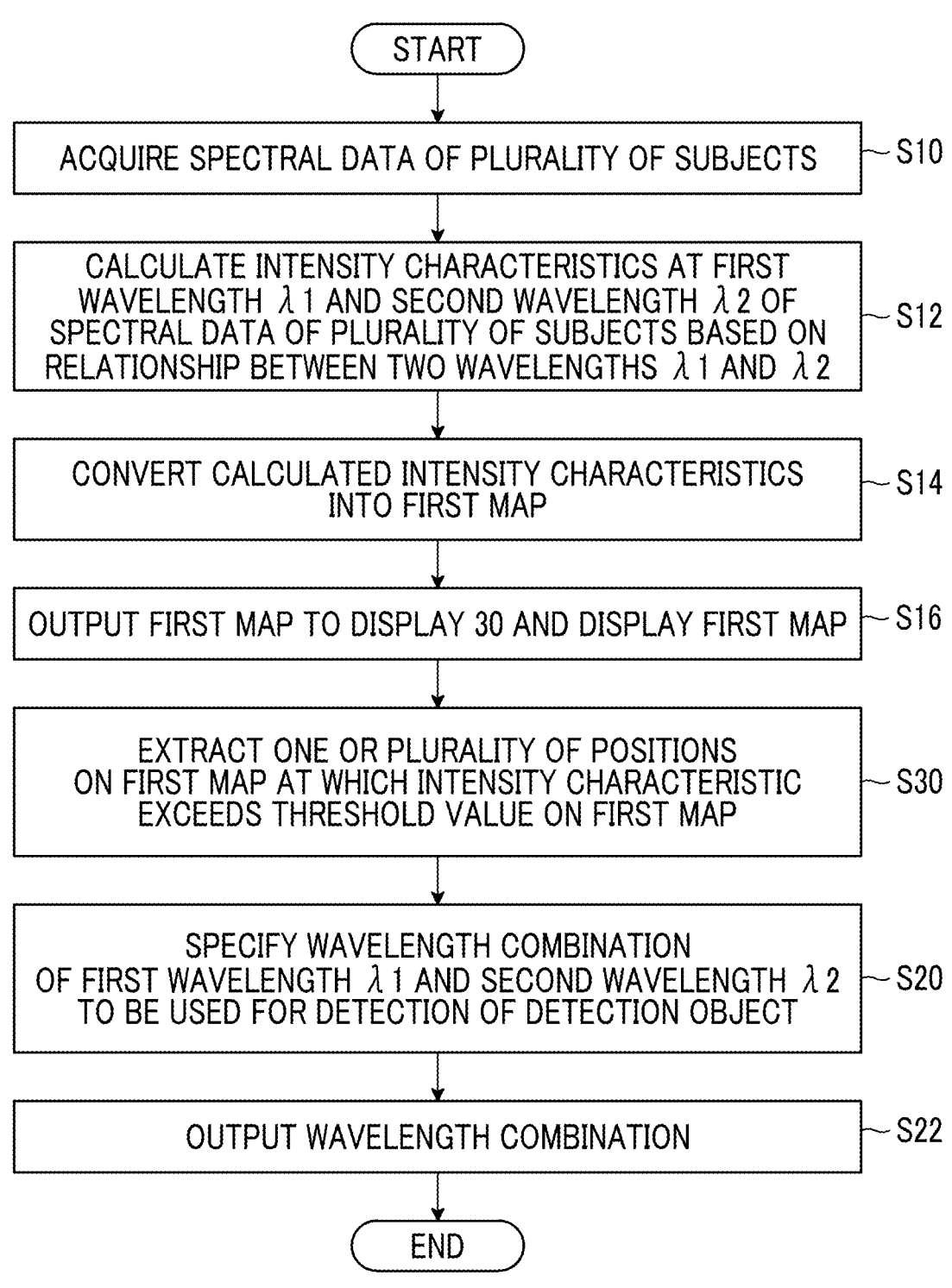
FIG. 19 is a flowchart showing a second embodiment of the data processing method according to the embodiment of the present invention.

FIG. 19 is a flowchart showing a second embodiment of the data processing method according to the embodiment of the present invention.

It should be noted that, in FIG. 19, the same step numbers are added to the steps common to the data processing method according to the first embodiment shown in FIG. 18, and the detailed description thereof will be omitted.

The data processing method according to the second embodiment shown in FIG. 19 is different from the data processing method according to the first embodiment shown in FIG. 18 in that processing of step S30 is executed instead of the processing of step S18 shown in FIG. 18.

In step S30 shown in FIG. 19, processing of extracting one or a plurality of positions on the first map at which the intensity characteristic exceeds the threshold value is executed on the first map showing the intensity distribution of the intensity characteristics.

For example, in step S30, it is possible to detect one or a plurality of regions in which the intensity characteristic exceeds the threshold value on the first map and obtain the position of the centroid of the detected regions to extract the one or plurality of position on the first map. In addition, a position having the highest intensity characteristic in the one or plurality of regions exceeding the threshold value may be set as a position in the region.

The position automatically extracted in this manner is used as the specific position on the first map. That is, the automatically extracted specific position can be used instead of the specific position, which is indicated by the user, according to the first embodiment.

It should be noted that, as a modification example of the data processing methods according to the first embodiment and the second embodiment, the candidates for the plurality of specific positions (plurality of wavelength combinations) may be automatically specified, the candidates for the specific position may be displayed in a superimposed manner on the first map, and one or two or more specific positions may be specified by the user indication from among the candidates for the specific position displayed in a superimposed manner on the first map.

Third Embodiment

Figure 20:
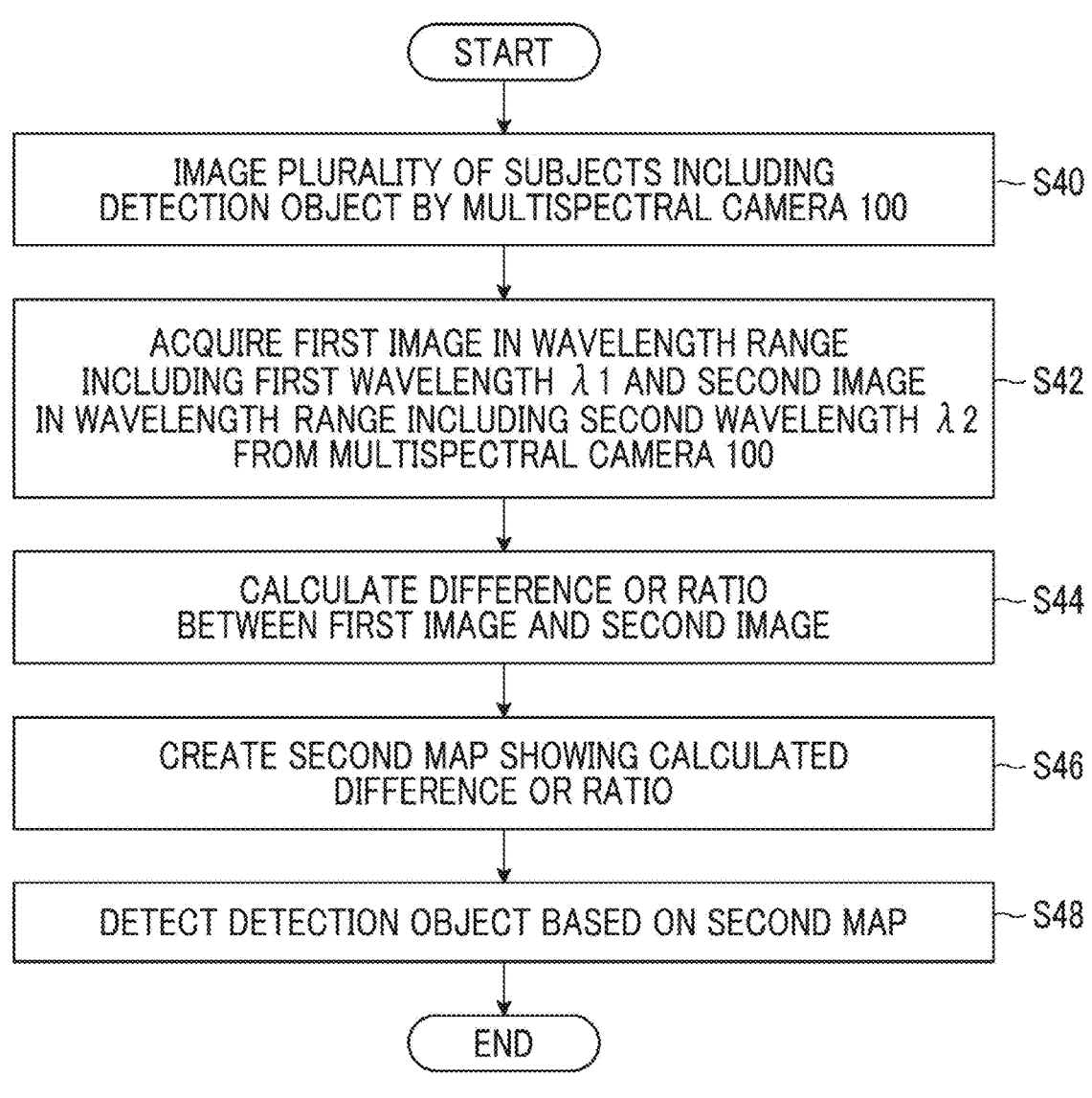
FIG. 20 is a flowchart showing a third embodiment of the data processing method according to the embodiment of the present invention.

FIG. 20 is a flowchart showing a third embodiment of the data processing method according to the embodiment of the present invention.

It should be noted that the third embodiment shown in FIG. 20 shows a case in which the detection object is detected by using the wavelength combination of the first wavelength λ1 and the second wavelength λ2 specified by the data processing methods according to the first and second embodiments shown in FIGS. 18 and 19. In addition, in a case in which the insect 2C on the leaf 2B placed on the paper 2A is used as the detection object as shown in FIG. 2, the wavelength combination suitable for the detection of the insect 2C is the first wavelength λ1 (=750 nm) and the second wavelength λ2 (=950 nm).

In FIG. 20, in a case in which the wavelength combination (for example, 750 nm and 950 nm) of the first wavelength λ1 and the second wavelength λ2 suitable for the detection of the detection object is specified by the data processing methods according to the first and second embodiments shown in FIGS. 18 and 19, the plurality of subjects including the detection object are imaged simultaneously by the multispectral camera 100 (see FIG. 17) including the first wavelength selection element (first bandpass filter) that transmits light in the wavelength range including the first wavelength λ1 and the second wavelength selection element (second bandpass filter) that transmits light in the wavelength range including the second wavelength λ2 (step S40).

The processor acquires the first image in the wavelength range including the first wavelength and the second image in the wavelength range including the second wavelength from the multispectral camera 100 (step S42, image acquisition step).

Subsequently, the processor calculates the difference or the ratio between the first image and the second image which are acquired (step S44), and creates the map (second map) showing the calculated difference or ratio (step S46, second map creation step).

FIG. 6 is a diagram showing an example of the second map showing the difference or the ratio between the first image and the second image acquired from the multispectral camera that images the subjects shown in FIG. 2.

Then, the processor detects the detection object based on the created second map (step S48). In the second map shown in FIG. 6, the contrast between the insect 2C, and the paper 2A and the leaf 2B on the background is clear, and the position of the insect 2C on the second map, the number of the insects 2C, and the like can be detected with high accuracy by using the second map.

[Others]

The plurality of subjects including the detection object are not limited to the plurality of subjects according to the present embodiment, and various objects can be considered. In addition, the wavelength combination to be specified may be two or more sets, and in that case, a multispectral camera having three or more wavelength selection elements is applied.

In the present embodiment, for example, the hardware structure of the processing units that execute various processing of the processor constituting the data processing apparatus is the following various processors.

The various processors include a central processing unit (CPU), which is a general-purpose processor that executes software (program) and functions as the various processing units, a programmable logic device (PLD), which is a processor of which a circuit configuration can be changed after manufacture, such as a field programmable gate array (FPGA), and a dedicated electric circuit, which is a processor having a circuit configuration that is designed for exclusive use in order to execute specific processing, such as an application specific integrated circuit (ASIC).

One processing unit may be configured by one of these various processors, or may be configured by two or more same type or different types of processors (for example, a plurality of FPGAs or a combination of the CPU and the FPGA). Moreover, a plurality of processing units may be configured by one processor. As a first example the configuration of the plurality of processing units by one processor, there is a form in which one processor is configured by a combination of one or more CPUs and software, and this processor functions as the plurality of processing units, as represented by a computer, such as a client or a server. Second, there is a form in which a processor, which realizes the functions of the entire system including the plurality of processing units with one integrated circuit (IC) chip, is used, as represented by a system on chip (SoC) or the like. As described above, various processing units are configured by one or more of the various processors described above, as the hardware structure.

Further, the hardware structure of these various processors is, more specifically, an electric circuit (circuitry) in which circuit elements, such as semiconductor elements, are combined.

In addition, the present invention includes the data processing program causing the computer to function as the data processing apparatus according to the embodiment of the present invention by being installed in the computer, and a non-volatile storage medium in which the data processing program is recorded.

Further, the present invention is not limited to the embodiments described above, and it is needless to say that the modifications can be made without departing from the spirit of the present invention.

EXPLANATION OF REFERENCES

1: hyperspectral camera
2A: paper
2B: leaf
2C: insect
4A, 6A: paper
4B, 4C: soil
6B: peanut skin
6C: peanut nut
10-1, 10-2: data processing apparatus
12: data acquisition unit
14: intensity characteristic calculation unit
16: data conversion unit
18: output unit
20: user indication reception unit
22: wavelength combination specifying unit
24: position extraction unit
30: display device
32: operation unit
100: multispectral camera
110: imaging optical system
110A: lens
110B: lens
120: filter unit
122: polarizing filter unit
122A: first polarizing filter
122B: second polarizing filter
124: bandpass filter unit
124A: first bandpass filter
124B: second bandpass filter
130: image sensor
140: signal processing unit
M1, M2, M3, M4, M5: marker
S10 to S22, S30, S40 to S46: step

What is claimed is:

1. A data processing apparatus comprising:
a processor configured to execute
data acquisition processing of acquiring spectral data of a plurality of subjects,
calculation processing of calculating intensity characteristics at a first wavelength and a second wavelength selected from wavelength ranges of the acquired spectral data of the plurality of subjects based on a relationship between two wavelengths which are the first wavelength and the second wavelength,
data conversion processing of converting the intensity characteristics calculated in the calculation processing into discrimination data of a specific subject for the wavelength range, and
output processing of outputting the discrimination data to an outside,
wherein the intensity characteristic is an intensity difference, and is calculated according to the following expressions $$\text{the intensity difference} = |[A(\lambda 1) - A(\lambda 2)] - [B(\lambda 1) - B(\lambda 2)]|$$

in a case in which spectral data of a first subject in the spectral data of the plurality of subjects is denoted by $A(\lambda)$, spectral data of a second subject in the spectral data of the plurality of subjects is denoted by $B(\lambda)$, and the first wavelength and the second wavelength, which are to be selected, are denoted by $\lambda 1$ and $\lambda 2$, respectively.

2. The data processing apparatus according to claim 1, wherein the discrimination data is a first map representing a change in the intensity characteristic with a wavelength as a variable.

3. The data processing apparatus comprising:
a processor configured to execute
data acquisition processing of acquiring spectral data of a plurality of subjects,
calculation processing of calculating intensity characteristics at a first wavelength and a second wavelength selected from wavelength ranges of the acquired spectral data of the plurality of subjects based on a relationship between two wavelengths which are the first wavelength and the second wavelength,
data conversion processing of converting the intensity characteristics calculated in the calculation processing into discrimination data of a specific subject for the wavelength range, output processing of outputting the discrimination data to an outside,
wherein the discrimination data is a first map representing a change in the intensity characteristic with a wavelength as a variable, and
the first map is a two-dimensional map, and coordinate axes of the two-dimensional map are the first wavelength and the second wavelength,
receive a specific position on the first map displayed on the display device in response to a user indication,
specify a wavelength combination of the first wavelength and the second wavelength to be used for detection of a detection object among the plurality of subjects based on the specific position,
acquire a first image in a wavelength range including the first wavelength in the specified wavelength combination and a second image in a wavelength range including the second wavelength,
calculate a difference image between the first image and the second image, which are acquired, and
create a second map showing the calculated difference image.

4. The data processing apparatus according to claim 3, wherein a destination of the output of the discrimination data to the outside is a display device.

5. The data processing apparatus according to claim 3, wherein the processor executes
processing of extracting one or a plurality of positions on the first map at which the intensity characteristic exceeds a threshold value from the first map, and
processing of specifying one or a plurality of wavelength combinations of the first wavelength and the second wavelength to be used for detection of a detection object among the plurality of subjects based on the extracted positions.

6. The data processing apparatus according to claim 5, wherein a destination of the output of the discrimination data to the outside is a display device, and
the processor executes processing of displaying candidates for a specific position in the one or plurality of wavelength combinations of the first wavelength and the second wavelength in a superimposed manner on the first map displayed on the display device, processing of receiving the specific position from among the candidates for the specific position in response to a user indication, and processing of specifying the wavelength combination of the first wavelength and the second wavelength based on the received specific position.

7. The data processing apparatus according to claim 3, wherein the plurality of subjects include a first subject, a second subject, and a third subject, in the data acquisition processing, spectral data of the first subject, spectral data of the second subject, and spectral data of the third subject are acquired, in the calculation processing, two or more intensity characteristics, out of the intensity characteristics of the spectral data of the first subject and the spectral data of the second subject at the first wavelength and the second wavelength, the intensity characteristics of the spectral data of the second subject and each spectral data of the third subject at the first wavelength and the second wavelength, and the intensity characteristics of the spectral data of the first subject and the spectral data of the third subject at the first wavelength and the second wavelength, are calculated, and in the data conversion processing, the two or more intensity characteristics are converted into two or more discrimination data.

8. An optical element comprising:

a first wavelength selection element; and a second wavelength selection element, wherein the first wavelength selection element transmits a wavelength range of the first wavelength in the wavelength combination specified by the data processing apparatus according to claim 3, and the second wavelength selection element transmits a wavelength range of the second wavelength in the wavelength combination specified by the data processing apparatus according to claim 3.

9. An imaging optical system comprising:

the optical element according to claim 8 that is disposed at a pupil position or in a vicinity of the pupil position.

10. An imaging apparatus comprising:

the imaging optical system according to claim 9; and an imaging element that captures a first optical image transmitted through the first wavelength selection element and a second optical image transmitted through the second wavelength selection element, which are image-formed by the imaging optical system.

11. A data processing method to be executed by a processor, comprising:

acquiring spectral data of a plurality of subjects;

calculating intensity characteristics at a first wavelength and a second wavelength selected from wavelength ranges of the acquired spectral data of the plurality of subjects based on a relationship between two wavelengths which are the first wavelength and the second wavelength;

converting the intensity characteristics calculated in the calculation step into discrimination data of a specific subject for the wavelength range; and outputting the discrimination data to an outside, wherein the intensity characteristic is an intensity difference, and is calculated according to the following expressions the intensity difference$=|[A(\lambda 1)-A(\lambda 2)]-[B(\lambda 1)-B(\lambda 2)]|$ in a case in which spectral data of a first subject in the spectral data of the plurality of subjects is denoted by $A(\lambda)$, spectral data of a second subject in the spectral data of the plurality of subjects is denoted by $B(\lambda)$, and the first wavelength and the second wavelength, which are to be selected, are denoted by $\lambda 1$ and $\lambda 2$, respectively.

12. The data processing method according to claim 11, wherein the discrimination data is a first map representing a change in the intensity characteristic with a wavelength as a variable.

13. A data processing method to be executed by a processor, comprising:

acquiring spectral data of a plurality of subjects;

calculating intensity characteristics at a first wavelength and a second wavelength selected from wavelength ranges of the acquired spectral data of the plurality of subjects based on a relationship between two wavelengths which are the first wavelength and the second wavelength;

converting the intensity characteristics calculated in the calculation step into discrimination data of a specific subject for the wavelength range; and outputting the discrimination data to an outside, wherein the discrimination data is a first map representing a change in the intensity characteristic with a wavelength as a variable, the first map is a two-dimensional map, and coordinate axes of the two-dimensional map are the first wavelength and the second wavelength, receiving a specific position on the first map displayed on the display device in response to a user indication, specifying a wavelength combination of the first wavelength and the second wavelength to be used for detection of a detection object among the plurality of subjects based on the specific position, acquiring a first image in a wavelength range including the first wavelength in the specified wavelength combination and a second image in a wavelength range including the second wavelength, calculating a difference image between the first image and the second image, which are acquired, and creating a second map showing the calculated difference image.

14. The data processing method according to claim 13, wherein a destination of the output of the discrimination data to the outside is a display device.

15. The data processing method according to claim 13, further comprising:

extracting one or a plurality of positions on the first map at which the intensity characteristic exceeds a threshold value from the first map; and specifying one or a plurality of wavelength combinations of the first wavelength and the second wavelength to be used for the detection of the detection object among the plurality of subjects based on the extracted positions.

16. The data processing method according to claim 15, wherein a destination of the output of the discrimination data to the outside is a display device, and the data processing method further comprises:

displaying candidates for a specific position in the one or plurality of wavelength combinations of the first wavelength and the second wavelength in a superimposed manner on the first map displayed on the display device;

receiving the specific position from among the candidates for the specific position in response to a user indication; and specifying the wavelength combination of the first wavelength and the second wavelength based on the received specific position.

17. The data processing method according to claim 13, wherein the plurality of subjects include a first subject, a second subject, and a third subject,
wherein spectral data of the first subject, spectral data of the second subject, and spectral data of the third subject are acquired,
wherein two or more intensity characteristics, out of the intensity characteristics of the spectral data of the first subject and the spectral data of the second subject at the first wavelength and the second wavelength, the intensity characteristics of the spectral data of the second subject and each spectral data of the third subject at the first wavelength and the second wavelength, and the intensity characteristics of the spectral data of the first subject and the spectral data of the third subject at the first wavelength and the second wavelength, are calculated, and
wherein the two or more intensity characteristics are converted into two or more discrimination data.

18. A non-transitory computer-readable recording medium on which a program for causing, when read by a computer, the computer to execute the data processing method according to claim 13 is recorded.

19. A data processing apparatus comprising:
a processor configured to execute
data acquisition processing of acquiring spectral data of a plurality of subjects, calculation processing of calculating intensity characteristics at a first wavelength and a second wavelength selected from wavelength ranges of the acquired spectral data of the plurality of subjects based on a relationship between two wavelengths which are the first wavelength and the second wavelength,
data conversion processing of converting the intensity characteristics calculated in the calculation processing into discrimination data of a specific subject for the wavelength range, and
output processing of outputting the discrimination data to an outside,
wherein the intensity characteristic is an intensity difference or an intensity ratio, and is calculated by the following expressions $$\text{Intensity difference} = \left| \frac{A(\lambda 1) - A(\lambda 2)}{A(\lambda 1) + A(\lambda 2)} - \frac{B(\lambda 1) - B(\lambda 2)}{B(\lambda 1) + B(\lambda 2)} \right| \quad \text{[Math. 1]}$$

$$\text{Intensity ratio} = \left| \frac{A(\lambda 1) - A(\lambda 2)}{A(\lambda 1) + A(\lambda 2)} \middle/ \frac{B(\lambda 1) - B(\lambda 2)}{B(\lambda 1) + B(\lambda 2)} \right| \quad \text{[Math. 2]}$$

in a case in which spectral data of a first subject in the spectral data of the plurality of subjects is denoted by $A(\lambda)$, spectral data of a second subject in the spectral data of the plurality of subjects is denoted by $B(\lambda)$, and the first wavelength and the second wavelength, which are to be selected, are denoted by $\lambda 1$ and $\lambda 2$, respectively.

\* \* \* \* \*